United States Patent
Guo et al.

(10) Patent No.: US 11,516,006 B2
(45) Date of Patent: *Nov. 29, 2022

(54) SYSTEMS AND METHODS FOR SELECTING AND UTILIZING A COMMITTEE OF VALIDATOR NODES IN A DISTRIBUTED SYSTEM

(71) Applicant: CYPHERIUM BLOCKCHAIN INC., New York, NY (US)

(72) Inventors: Yangrui Guo, Long Island City, NY (US); Qiandong Yang, Shenzhen (CN); Hui Zhou, Hong Kong (CN); Weiqiang Lu, Shenzhen (CN); Sheng Zeng, Shenzhen (CN)

(73) Assignee: Cypherium Blockchain Inc., New York, NY (US)

( * ) Notice: Subject to any disclaimer, the term of this patent is extended or adjusted under 35 U.S.C. 154(b) by 482 days.

This patent is subject to a terminal disclaimer.

(21) Appl. No.: 16/796,082

(22) Filed: Feb. 20, 2020

(65) Prior Publication Data

US 2021/0097537 A1    Apr. 1, 2021

Related U.S. Application Data

(60) Provisional application No. 62/907,412, filed on Sep. 27, 2019.

(51) Int. Cl.
*H04L 9/08* (2006.01)
*H04L 9/06* (2006.01)
(Continued)

(52) U.S. Cl.
CPC .............. *H04L 9/0836* (2013.01); *G06F 3/00* (2013.01); *G06F 11/00* (2013.01); *G06F 16/00* (2019.01);
(Continued)

(58) Field of Classification Search
CPC ....... H04L 9/0836; H04L 9/00; H04L 9/0637; H04L 9/0643; H04L 9/30; H04L 9/3247;
(Continued)

(56) References Cited

U.S. PATENT DOCUMENTS 9,608,829 B2    3/2017  Spanos et al.
10,158,527 B2   12/2018 Anderson et al.
(Continued)

FOREIGN PATENT DOCUMENTS

CN    107171829 A    9/2017
CN    108965469 A    12/2018
(Continued)

OTHER PUBLICATIONS

Dylan Yaga, Blockchain Technology Overview, Oct. 2018 (Year: 2018).*

(Continued)

*Primary Examiner* — John W Hayes
*Assistant Examiner* — Dennis G Keritsis
(74) *Attorney, Agent, or Firm* — Miller & Martin PLLC

(57) ABSTRACT

The disclosed embodiments provide a distributed transaction system including a group of validator nodes that are known to each other in a network but are indistinguishable to other network nodes. The validator nodes form a Committee including a Leader node and one or more Associate nodes configured to receive and process transaction requests and candidate requests, for example, to add new blocks to one or more blockchains. The Committee may be dynamically changed, such that new network nodes may be added to the Committee or may replace existing validator nodes. The Associate nodes also may coordinate with each other to select a new Leader node. The system may allow multiple request-fulfillment process to run simultaneously, thereby enhance the efficiency of the system. The disclosed embodi- (Continued)

ments reduce the distributed system's reliance on the stability of any particular node(s) in the network, as the validator nodes in the Committee may be changed at a sufficient frequency to remove unreliable, unavailable, or otherwise untrusted nodes. Further, the disclosed embodiments provide a scheme that helps ensure the Leader node, as well as the other Committee members, functions properly.

18 Claims, 16 Drawing Sheets

(51) Int. Cl.
| | |
|---|---|
| H04L 9/32 | (2006.01) |
| H04L 67/104 | (2022.01) |
| G06F 16/182 | (2019.01) |
| G06Q 20/38 | (2012.01) |
| H04L 9/30 | (2006.01) |
| G06Q 20/22 | (2012.01) |
| H04L 67/00 | (2022.01) |
| G06F 11/00 | (2006.01) |
| G06F 16/00 | (2019.01) |
| H04L 9/00 | (2022.01) |
| G06F 3/00 | (2006.01) |
| G06F 16/27 | (2019.01) |

(52) U.S. Cl.
CPC ....... *G06F 16/1837* (2019.01); *G06Q 20/223* (2013.01); *G06Q 20/3825* (2013.01); *G06Q 20/3829* (2013.01); *G06Q 20/38215* (2013.01); *H04L 9/00* (2013.01); *H04L 9/0637* (2013.01); *H04L 9/0643* (2013.01); *H04L 9/30* (2013.01); *H04L 9/3247* (2013.01); *H04L 9/3255* (2013.01); *H04L 9/3265* (2013.01); *H04L 9/3297* (2013.01); *H04L 67/00* (2013.01); *H04L 67/1051* (2013.01); *G06F 16/27* (2019.01); *H04L 9/50* (2022.05)

(58) Field of Classification Search
CPC ... H04L 9/3255; H04L 9/3265; H04L 9/3297; H04L 67/00; H04L 67/1051; H04L 9/50; H04L 63/123; H04L 9/3239; G06F 3/00; G06F 11/00; G06F 16/00; G06F 16/1837; G06F 16/27; G06Q 20/223; G06Q 20/38215; G06Q 20/3825; G06Q 20/3829; G06Q 20/02; G06Q 20/065; G06Q 20/3678; G06Q 20/3827; G06Q 20/389; G06Q 20/401; G06Q 20/4016
See application file for complete search history.

(56) References Cited

U.S. PATENT DOCUMENTS

| | | | | |
|---|---|---|---|---|
| 10,666,778 | B1* | 5/2020 | Yang | G06F 16/1824 |
| 2014/0040898 | A1* | 2/2014 | Karp | G06F 9/466 |
| | | | | 718/101 |
| 2014/0143205 | A1* | 5/2014 | Leshchiner | G06F 16/27 |
| | | | | 707/626 |
| 2015/0310054 | A1* | 10/2015 | Passey | G06F 16/185 |
| | | | | 707/703 |
| 2017/0201590 | A1* | 7/2017 | Wojciechowski | G06F 11/182 |
| 2018/0337882 | A1* | 11/2018 | Li | H04L 61/35 |
| 2020/0004643 | A1* | 1/2020 | Yang | H04L 9/0637 |
| 2020/0162264 | A1* | 5/2020 | Zamani | H04L 9/3247 |
| 2020/0183951 | A1* | 6/2020 | Mittal | G06F 16/2365 |
| 2020/0204351 | A1* | 6/2020 | Chen | H04L 9/0643 |
| 2020/0394648 | A1* | 12/2020 | Blackshear | G06Q 20/3823 |
| 2021/0026745 | A1* | 1/2021 | Wang | H04L 63/1416 |

FOREIGN PATENT DOCUMENTS

| | | | |
|---|---|---|---|
| CN | 109039748 A | 12/2018 | |
| WO | WO-2020254923 A1 * | 12/2020 | G06F 21/64 |

OTHER PUBLICATIONS

Yin, HotStuff: BFT Consensus with Linearity and Responsiveness (Year: 2019).*
Eyal, Bitcoin-NG: A Scalable Blockchain Protocol (Year: 2015).*
Ittay Eyal, Bitcoin-NG A Scalable Blockchain Protocol tech presentation (Year: 2016).*
Wan, Goshawk: A Novel Efficient, Robust and Flexible Blockchain Protocol (Year: 2018).*
Mohammad Mussadiq Jalalzai, Fast-HotStuff: A Fast and Robust BFT Protocol for Blockchains, https://www.youtube.com/watch?v=AVGD_AWf47g (Year: 2022).*
Ying et al., HotStuff: BFT Consensus in the Lens of Blockchain (Year: 2019).*
Isaac Cameron Sheff, Serializability and Heterogeneous Trust From Two Phase Commit to Blockchains (Year: 2019).*
Syta, Keeping Authorities (Year: 2016).*
Paper #9. HotStuff BFT Consensus in the Lens of Blockchain, https://www.youtube.com/watch?v=GAGW-c4hADA (Year: 2022).*
Castro, Practical Byzantine Fault Tolerance (Year: 1999).*
Sync HotStuff Simple and Practical Synchronous State Machine Replication, https://www.youtube.com/watch?v=mEWrrdP4kGE (Year: 2022).*
Amsden, The Libra Blockchain (Year: 2020).*
bit2me.com, What is Signature Aggregation or Signature Aggregation_ (Year: 2022).*
ZK-TLV 0×09—Ittai Abraham—The HotStuff approach to BFT (Part 3), https://www.youtube.com/watch?v=ONobl3X70Rc (Year: 2022).*
Amsden, Zachary et al., The Libra Blockchain, Revised Jul. 23, 2019, pp. 1-29; https://developers.libra.org/docs/assets/papers/the-libra-blockchain.pdf.
Ittay Eyal et al., "Bitcoin-NG: A Scalable Blockchain Protocol," 13th USENIX Symposium on Networked System Design and Implementation (NSDI '16), pp. 45-59 (2016).
Lamport, Leslie et al., The Byzantine Generals Problem, AMCM Transactions on Programming Language and Systems, vol. 4, No. 3, Jul. 1982, pp. 382-401.
Syta, Ewa et al., Keeping Authorities "Honest or Bust" with Decentralized Witness Cosigning, arXiv:1503.08768v.4 [cs.CR] May 30, 2016, 20 pages.
Yin, Maofan et al., HotStuff: BFT Consensus in the Lens of Blockchain, arXiv:1803.05069v6 [cs.DC] Jul. 23, 2019, pp. 1-23.
Guo, "Cypherium: A Scalable and Permissionless Smart Contract Platform" White Paper Draft v1.0 (undated).
Guo, "Cypherium: A Scalable and Permissionless Smart Contract Platform" White Paper Draft v1.1 (undated).

* cited by examiner

|        | generic phase 1 | generic phase 2 | generic phase 3 | generic phase 4 | generic phase 5 |
|--------|-----------------|-----------------|-----------------|-----------------|-----------------|
| node 1 | Prepare | Pre-Commit | Commit | Decide | |
| node 2 | | Prepare | Pre-Commit | Commit | Decide |
| node 3 | | | Prepare | Pre-Commit | Commit |
| node 4 | | | | Prepare | Pre-Commit |

*FIG. 13*

SYSTEMS AND METHODS FOR SELECTING AND UTILIZING A COMMITTEE OF VALIDATOR NODES IN A DISTRIBUTED SYSTEM

RELATED APPLICATIONS

The present application claims the benefit of priority to U.S. Provisional Application No. 62/907,412, entitled "SYSTEMS AND METHODS FOR SELECTING AND UTILIZING A COMMITTEE OF VALIDATOR NODES IN A DISTRIBUTED SYSTEMS," filed Sep. 27, 2019, which is hereby incorporated by reference in its entirety.

FIELD OF THE INVENTION

The disclosed embodiments relate to distributed transaction-based systems and, more particularly, systems and methods for selecting and utilizing a group of validator nodes that may be used to verify and record transactions for one or more blockchains in a distributed system.

BACKGROUND OF THE INVENTION

A network is a collection of interconnected nodes that exchange information. The nodes can include computers, servers, mobile devices, or any other device that can be configured to communicate with other nodes in the network. The network may be configured as a centralized system, such as a client-server system having one or more central servers in communication with one or more client devices, or may be configured as a decentralized system, such as a peer-to-peer (P2P) network. A P2P network is a system in which each network node, sometimes called a "peer," may be directly connected to one or more other nodes in the network. Peers typically have similar privileges and may share a portion of their resources with other peers in the network without coordination by any centralized servers or hosts. P2P networks have been implemented using various technologies, including for example file-sharing systems, such as Napster, and blockchain technologies, such as Bitcoin.

A transaction-based system is a system that processes data in units of "transactions," which may have different contents, formats, or other characteristics depending on the system. An example of a conventional transaction-based system is Sabre, which is a system used by travel agents and companies to process transactions that are used to book airline tickets. A transaction may be a message, event, or process initiated or invoked by a user or computer program, and may provide a single unit of work in the system. For example, a transaction may contain data corresponding to an electronic funds transfer between different bank accounts. A transaction could also correspond to an event when two or more parties enter into an agreement, such as a legal contract. In this example, the action of entering into the agreement is processed and recorded as a single transaction, and the transaction data may correspond to the agreement itself and/or any other information relating to the agreement. In another example, each transaction may correspond to the identity of the party or parties that have signed an agreement, in which case the signing of the agreement by each party is processed and recorded as one transaction. A transaction, alone or combined with other transactions, may be represented or transmitted as a unit of data. In a Bitcoin setting, a transaction usually is defined as the transfer of a certain amount of Bitcoin cryptocurrency from one Bitcoin account to another.

To facilitate a demand for higher speed processing and convenience in transaction-based systems, some transaction-based systems have been built on network infrastructures. Originally and conventionally, such systems have been implemented in centralized networks: all of the transactions were processed by centralized servers and the related transaction data was stored in centralized databases. The system reliability thus depended solely on the reliability of the centralized system. A failure of the centralized server could cause catastrophic results to the transaction-based system.

A decentralized transaction-based system, sometimes referred to as a distributed transaction-based system, is desirable because the system depends less on centralized servers and, thus, may be more reliable. Implementing such a distributed system on a P2P network is often preferred because the necessity of using a centralized host server is eliminated and the system is reliable until many network nodes fail at the same time, which is typically unlikely. However, implementing such a distributed transaction-based system is challenging because the lack of a centralized host may result in complicated and dynamic component interdependencies. Several critical issues must be solved: for example, how is transaction data organized and stored in the system; how is a consensus reached by the network nodes to confirm or reject a new transaction request; and how are network nodes in the system authenticated and/or their authentication verified.

Unlike in a centralized system, data in a distributed P2P system may be stored as many copies, for example, by one or more of the network nodes. For example, each node may have a copy of the entire data set in a transaction-based system or it may store only a portion of the data. Many schemes have been designed to ensure that each network node may effectively store and verify the system data through cooperation with the other nodes.

One exemplary scheme uses blockchain technology, which is widely known as the technology behind the popular cryptocurrency Bitcoin. In a blockchain scheme, transaction data can be organized into discrete "blocks," each of which may be linked with a predecessor ("parent") block by storing a cryptographic hash value of the parent block, or by using other techniques such as using hash values and/or digital signatures of one or more preceding blocks. The contents in each block can be verified against its cryptographic hash value stored in a subsequent adjacent ("child") block. Therefore, once the accuracy of the current block of the blockchain is verified, a network node can verify every preceding block contained in the blockchain without having to contact any of the other nodes.

The Bitcoin system is one of the most well-known implementations of blockchain technologies in distributed transaction-based systems. In Bitcoin, each network node competes for the privilege of storing a set of one or more transactions in a new block of the blockchain by solving a complex computational math problem, sometimes referred to as a mining proof-of-work (POW). Under current conditions, a set of transactions is typically stored in a new block of the Bitcoin blockchain at a rate of about one new block every 10 minutes, and each block has an approximate size of one megabyte (MB). Accordingly, the Bitcoin system is subject to an impending scalability problem: only 3 to 7 transactions can be processed per second, which is far below the number of transactions processed in other transaction-based systems, such as the approximately 30,000 transactions per second in the Visa™ transaction system.

Bitcoin-NG, or the Bitcoin Next Generation system, attempts to solve this scalability problem by introducing a network node in the P2P system that acts as a leader node that processes transactions and adds new blocks to the Bitcoin blockchain. This system includes two separate blockchains: a Transaction blockchain for storing the transaction data and a Keyblock blockchain for publishing a public key, which may be a temporary "epoch" public key assigned to the current leader node. In Bitcoin-NG, the Keyblock blocks are generated in the same way as transaction blocks are generated in the conventional Bitcoin network, except the Keyblock blocks contain only the public key that the leader node will use to sign new blocks added to the Transaction blockchain. Thus, the leader node is the node that generated the latest block in the Keyblock blockchain and that digitally signs new blocks added to the Transaction blockchain using a private key corresponding to its published epoch public key.

While Bitcoin-NG does solve conventional Bitcoin's scalability problem, as the leader node in Bitcoin-NG can process new transaction blocks more efficiently than using the POW approach of conventional Bitcoin, it somewhat reverts Bitcoin from a distributed system to a system by having a single leader node at any given time. As such, the reliability and the security of the Bitcoin-NG system depends, at least partially, on the reliability and security of that leader node. The failure of the leader node may cause a catastrophic failure of the system. The Bitcoin-NG system is described, for example, in the paper by Ittay Eyal et al., "Bitcoin-NG: A Scalable Blockchain Protocol," 13$^{th}$ USENIX Symposium on Networked System Design and Implementation (NSDI '16), pp. 45-59 (2016), which is incorporated by reference herein.

Another issue rooted in a conventional distributed system is the Byzantine fault problem, which addresses how a system of multiple nodes can reach a consensus for agreeing when to change the system's state. The Byzantine fault problem requires that nodes must agree on a concrete strategy to reach a consensus to avoid a system failure, even where some of the nodes may be unreliable. Castro et al., "Practical Byzantine Fault Tolerance," Proceedings of the Third Symposium on Operating System Design and Implementation, New Orleans, USA (February 1999), which is incorporated by reference herein, introduced a two-round peer-to-peer message exchange technique to achieve a consensus. Initially, a leader node sends a system state-transition request to each of the other nodes in the network. In the first round, each node communicates with each of the other nodes to confirm that enough nodes have received the state-transition request, and then the nodes validate the request after confirming a first threshold number of nodes received it. In the second round, each node communicates with each of the other nodes to confirm that a second threshold number of nodes were able to validate the request. If the second threshold is satisfied, the nodes finalize the requested system state-transition based on the second round of confirmation. Because each node communicates with each of the other nodes in the system to reach a consensus, such a system is referred as a mesh communication network. Because only a threshold number of nodes are required to reach a consensus, a fault tolerance that permits a certain number of faulty nodes can be achieved in the Practical Byzantine Fault Tolerance (PBFT) system. However, PBFT's solution is not efficient when the system is scaled up. The communication costs necessary to form a consensus in the mesh network increases exponentially as the number of nodes increases in the PBFT system, again resulting in a scalability problem. Further, the identities of the nodes are known to other nodes in the network, exposing all the nodes to potential attacks from other nodes in or out of the network. Given the nodes in PBFT are not reconfigurable, the failure of sufficient number of nodes may also cause catastrophic failure of the system.

In the PBFT system, a "view" refers to a period of time that a node serves as the leader node. When a node in the PBFT system discovers that the leader node has failed, it broadcasts a request to each of the other nodes in the system to change the leader node, which is a "view change" request. When a node receives enough view-change requests, it first determines a new leader node based on predefined rules and sends a view-change confirmation to the new leader node. The next "view" starts when the new leader node receives enough view-change confirmations from the other nodes in the PBFT system.

As a recent development, "HotStuff" introduced a protocol that modifies the mesh communication network in the PBFT system, merging the view-change process for changing a leader node with generation of transaction blocks, resulting a three-phase protocol. HotStuff is described, for example, by Maofan Yin et al., "HotStuff: BFT Consensus in the Lens of Blockchain," document no. arXiv:1803.05069 (March 2018), which is incorporated by reference herein. Because each node communicates all of its messages (including transaction requests) directly to the leader node instead of indirectly sending them to the leader node via one or more other nodes, the communication complexity of the HotStuff system is greatly reduced. However, even with such reduced communications, the HotStuff network still faces scalability issues. For example, the number of nodes is limited to the capability of the leader node to process transaction requests from a large number of nodes. In addition, as the number of nodes grows, the system slows because of the time and resources consumed while processing and waiting for digital signatures for messages requiring multiple cosigners. Further, because the identity of the leader node is public to all of the nodes in the network, the leader node may be subject to attacks by malicious third parties, which also may decrease the reliability of the system.

Tendermint and Casper, two blockchains that rose to prominence in 2018, brought to public view two new variants of PBFT that simplify a traditional aspect of the consensus mechanism. These projects retrofitted PBFT's leader-replacement protocol with linearity, meaning only linear communication cost would be levied on network participants. However, in order to add this economic aspect to their networks, the two projects sacrificed a cornerstone of practical consensus called responsiveness. In brief and plain terms, responsiveness refers to a dynamic wherein appointed leaders of a PBFT consensus may generate after receiving a fixed number of communications, instead of waiting for a mandatory fixed delay. Tendermint and Casper, in this way, brought to the PBFT space a trade-off between linearity and responsiveness. The HotStuff algorithm, which has been adopted by Facebook's Libra, as well as some other recent blockchains, have resolved this trade-off. Cypherium's CypherBFT, which also utilizes HotStuff, does not need to choose between responsiveness and linearity.

There are a number of new distributed ledger technologies that do not use traditional blockchain data structures, favoring instead direct acyclic graphs (DAGs), which allow blocks to be authored and accepted simultaneously, instead of through a single, total-ordered chain. Hashgraph and Conflux might be two of the most notable examples of such projects. However, these graphs are not without their weaknesses. One particularly notable shortcoming of DAGs is the recovery of data. If a network participant loses connection to the network for whatever reasons, it is much harder to recover the graph information than it is to retrace the history of a true blockchain. Cypherium's dual blockchain structure includes the speeds of a dag, but its recall for users can happen much simpler and faster, which adds to the availability of information and makes the information more decentralized.

Another issue with conventional distributed transaction-based systems relates to authentication of the nodes using digital signatures. In a typical distributed system, for example, each node must confirm that each information it receives is actually originated from the node that appears to have sent the information. Digital signatures are typically used to verify the authenticity of the sender of the information. Conventionally, digital signatures require each node to store a pair of keys: a public key and a private key. Each node keeps its own private key confidential, and does not share it with other nodes in the network, whereas the node publishes its public key to all of the other nodes in the network. The node digitally signs information using its private key and the other nodes may verify the signature using the signer's public key, which must be made available by the signing node. However, as the number of nodes in the network grows, each being capable of digitally signing information communicated in the network, the communicated information may be accompanied with several different digital signatures. In this case, each node has to verify each digital signature individually, resulting in another bottleneck of scalability for the distributed system.

A multi-signature scheme can be implemented where a group of signers, each having their own cryptographic public/private key pair, collaboratively digitally sign a single message m. The resulting signature can be verified using a set of public keys corresponding to the signers or, in other multi-signature schemes, using a common public key.

In a 2016 paper, Ewa Syta et al., "Keeping authorities 'honest or bust' with decentralized witness cosigning," 2016 IEEE Symposium on Security and Privacy, pp. 526-545, (May 2016), Ewa Syta et al. published their "CoSi" protocol, which allows a group of cosigners to sign a message collaboratively, through two rounds of communication. CoSi makes scalable the use of cryptographic multi-sig methods, which can endow a network with thousands of witnesses by implementing communication trees that serve to aggregate the witnesses' signatures. Ewa Syta et al., describe in their paper the "CoSi" protocol's ability to keep authorities accountable through their decentralized witness cosigning. However, the two-round communication protocol is not efficient and the tree structure is not stable. Once an intermediate node has gone off-line, become compromised (e.g., hacked), failed (e.g., due to hardware malfunction), or otherwise is unavailable or no longer trusted, the signatures from all of its child nodes no long work. CypherBFT applies Boneh-Lynn-Shacham (BLS) signature scheme based on Barreto-Naehrig elliptic curves. This enables CypherBFT to accomplish aggregate signature by just one-round communication.

EOS's delegated Proof-of-Stake (DPoS) consensus involves a three-tiered process. The first tier has EOS token holders hold a referendum to choose 21 Block Producers (BPs). Those elected Block Producers are then delegated to perform the second tier of the consensus by generating blocks. Lastly, the third tier consists of the 21 BPs conducting Byzantine Fault Tolerant consensus, wherein approved blocks can be irreversibly admitted to the blockchain history. The block my be considered truly confirmed having completed this process.

EOS boasts that it can produce a new block every half-second. However, the true confirmation of these blocks cannot be considered final until their BFT consensus has been performed, and that process takes roughly three minutes. To propose and proliferate new, unconfirmed blocks has little bearing on the health of the blockchain itself.

Cypherium, on the other hand, runs its proprietary CypherBFT consensus, anchored by the HotStuff algorithm, and can authentically offer instant finality for its network users. With its HotStuff-based design, the CypherBFT's runtime lasts only 20-30 milliseconds (ms). Two-to-three confirmations are all that is required to permanently accept a proposed block into the blockchain, and it only takes 90 ms for these confirmations to transpire, making the process significantly faster than the two-minutes required by EOS.

SUMMARY OF THE INVENTION

The present invention overcomes disadvantages of the prior art by providing a distributed transaction system including a group of validator nodes that are known to each other in a network but are indistinguishable to the other network nodes in the network. As used herein, the group of validator nodes may be referred to as a "Committee" of validator nodes. In some embodiments, the system reconfigures one or more validator nodes in the Committee based on the results of proof-of-work (POW) challenges. According to some disclosed embodiments, a network node that is not already-a validator node in the Committee may be added to the Committee if it successfully completes a POW challenge. In such an event, the network node may become a new validator node in the Committee, replacing an existing validator node. In alternative embodiments, a network node may become a new validator node in the Committee based on a proof-of-stake (POS) consensus. In yet another embodiment, a network node may become a new validator node in the Committee based on a proof-of-authority (POA) consensus. In other alternative embodiments, a network node may become a new validator node in the Committee based on a combination of any of POW, POA, and POS consensus.

In some disclosed embodiments, the new validator node replaces a validator node in the Committee. The replacement may be based on a predetermined rule known by all the nodes in the network. For example, the new validator node may replace the oldest validator node in the Committee. According to another example, the new validator node may replace a validator node that has been determined to have gone off-line, become compromised (e.g., hacked), failed (e.g., due to hardware malfunction), or otherwise is unavailable or no longer trusted. In the exemplary embodiments, the distributed system assumes that for a fault-tolerance of f nodes, the Committee includes at least 3f+1 validator nodes. Because the validator nodes in the Committee may be frequently replaced, for example, depending on the amount of time required to complete the POW challenges, it is difficult for malicious third parties to detect the complete set of validator nodes in the Committee at any given time.

In accordance with some disclosed embodiments, the validator nodes in the Committee may receive transaction requests from other network nodes, for example, in a P2P network. The Committee may include at least one validator node that serves as a "Leader" validator node; the other validator nodes may be referred to as "Associate" validator nodes. The Leader node may be changed periodically, on demand, or sporadically by the members of the Committee. When any validator node receives a new transaction request from a non-validator node in the network, the transaction request may be forwarded to all of the validator nodes in the Committee. Further to the disclosed embodiments, the Leader node coordinates with the other Associate validator nodes to reach a consensus of a disposition (e.g., accept or reject) for a transaction block containing the transaction request and broadcasts the consensus to the entire P2P network. If the consensus is to accept or otherwise validate the transaction request, the requested transaction may be added in a new block of a blockchain that is known to at least some of the network nodes in the network.

In accordance with some embodiments, the Leader node may use improved protocols for reaching a consensus with the Associate validator nodes in the Committee when determining the disposition of a received request, such as a transaction request to add one or more transactions to an existing blockchain or a candidate request to request that a node join the Committee as a new validator node. For example, in some embodiments, the Leader node may use aggregate signatures in reaching a consensus for a new transaction request, allowing the consensus to be reached by validating digital signatures from fewer than all of the validator nodes in the Committee. In contrast with prior systems, the Leader node's use of aggregate signatures may permit the Committee to reach a consensus of whether to accept or reject a preliminary transaction block faster and/or more efficiently, for example, in the event that one or more of the validator nodes in the Committee do not respond sufficiently quickly or at all. In some embodiments, as long as the number of responding validator nodes reaches a predetermined threshold, the Leader node can conclude that a consensus in the Committee has been reached. In some exemplary embodiments, in a network having a fault-tolerance of f nodes, and the Committee includes 3f+1 validator nodes, this predetermined threshold may be set equal to 2f+1 validator nodes.

In accordance with some disclosed embodiments, the improved protocols used by the Leader node for reaching a consensus based on receipt of a new transaction request or candidate request may comprise a plurality of phases. In some embodiments, the Leader node employs a three-phase protocol, for example including a Prepare phase, a Pre-Commit phase, and a Commit phase, for determining whether to accept or reject a new transaction request or candidate request. In other exemplary embodiments, the Leader node may determine the disposition of the new request using a two-phase protocol, for example including a Prepare phase and a Commit phase.

Advantageously, the disclosed embodiments provide a distributed-system architecture and related protocols that allow a distributed system, such as a blockchain system, to scale up without incurring an unacceptable increase in decision-making complexity while also preserving the benefit of using a decentralized system. The disclosed embodiments reduce the distributed system's reliance on the stability of any particular node(s), as the validator nodes in the Committee may be changed at a sufficient frequency to remove unreliable, unavailable, or otherwise untrusted nodes. Further, the system and method of the disclosed embodiments provides a scheme that helps ensure the Leader node, as well as the other Committee members, functions properly.

It is to be understood that both the foregoing general description and the following detailed description are exemplary and explanatory only and are not restrictive of the disclosed embodiments or the scope of the inventions as claimed. The concepts in this application may be employed in other embodiments without departing from the scope of the inventions.

BRIEF DESCRIPTION OF THE DRAWINGS

The drawings are not necessarily to scale or exhaustive. Instead, emphasis is generally placed upon illustrating the principles of the inventions described herein. The accompanying drawings, which are incorporated in and constitute a part of this specification, illustrate several embodiments consistent with the disclosure and together with the description, serve to explain the principles of the disclosure. In the drawings:

FIG. 13 depicts an exemplary pipelined process for a request-fulfillment process where multiple request-fulfillment processes may be conducted concurrently in accordance with certain disclosed embodiments of the invention.

DETAILED DESCRIPTION OF EXEMPLARY EMBODIMENTS

Figure 1:
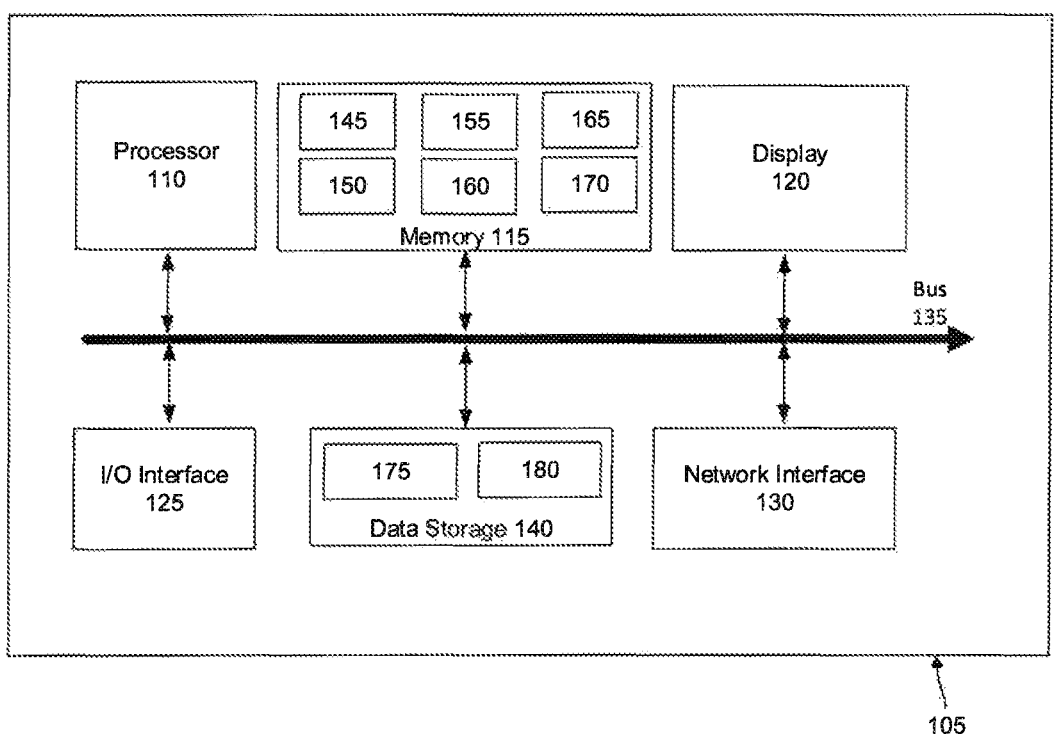
FIG. 1 is a schematic block diagram of an exemplary computing system that may be used as a network node in accordance with certain disclosed embodiments of the invention.

FIG. 1 is a schematic of an exemplary computing system 105 that may be used as a network node in a network 200 in accordance with the systems and methods of the disclosed embodiments. The computing system may be configured to function, for example, as any of a Client node, Common node, Associate node, or Leader node in the disclosed embodiments. Computing system 105 includes, for example, one or more processors 110, a memory 115, a display 120, input/output (I/O) interface(s) 125, network interface(s) 130, and data storage 140. These components in the computing system may communicate with each other via a system bus 135, wirelessly, or via one or more wired or wireless communication paths. The components in FIG. 1 may reside in a single device or in multiple devices.

Consistent with the disclosed embodiments, a processor 110 may comprise at least one of a central processing unit (CPU), graphical processing unit (GPU), or similar microprocessor having one or more processing cores. Computing system 105 may include one or more processors 110 and may further operate with one or more other processors that may be located in one or more remote systems. Memory 115 may include non-volatile and/or volatile memory configured to store software instructions for execution on the processor 110, and may include one or more of random access memory (RAM), solid state memory, magnetic memory, register memory, cache memory, or any other type of memory. In some embodiments, memory 115 may comprise one or more removable modules or may at least partially reside in a remote storage device (not shown) outside of system 105. In some embodiments, the memory 115 may be configured to store data and instructions, such as software programs. For example, memory 115 may be configured to store data and instructions. In some embodiments, processor 110 may be configured to execute instructions and/or programs stored in memory 115 to configure computing system 105 to perform operations of the disclosed systems and methods. In various aspects, as would be recognized by one of skill in the art, processor 110 may be configured to execute at least some instructions and/or software programs stored on a remote memory to perform operations of the disclosed systems and methods.

In accordance with certain disclosed embodiments, the memory 115 may include one or more of a campaign engine 145, candidate-selection engine 150, vote-decision engine 155, coordination engine 160, signature engine 165, and view-change engine 170, which may be embodied in one or more software programs, modules, libraries, and/or applications stored in memory 115. The software also may be stored in one or more other data storage devices 140, such as a hard drive or other non-volatile memory for longer term storage.

Campaign engine 145 may generate candidate requests during a first stage of a reconfiguration process, for example, as described in detail with reference to FIG. 7. Candidate-selection engine 150 may verify candidate requests (such as by verifying digital signatures in those requests) and select one or more "best" candidate nodes, for example, as described with reference to FIG. 8. Vote-decision engine 155 may verify information transmitted from a Leader node (such as by verifying a digital signature associated with the information) and generate a voting decision based on the verification, for example, as described with reference to FIG. 10. Coordination engine 160 may determine the content of a block of a blockchain and/or generate new blocks for a blockchain. Signature engine 165 may be configured to generate digital signatures using a private key associated with the computing system 105, such as generating partial signatures and aggregated signatures. The signature engine also may be configured to verify received digital signatures using the public keys of other nodes, such as verifying received partial signatures.

View-change engine 170 may detect the need for a view change in a transaction-based system, select a new Leader node, and/or vote for a new Leader node. Depending on the type of a node, certain engines may be loaded and activated, and other engines may be deactivated or deleted from the memory. For example, when a node is configured as a Common node, campaign engine 145 may be loaded and activated and one or more of the other engines 150, 155, 160, 165, and 170 may be deactivated and/or removed from the memory 115. In some embodiments, when a node is configured as an Associate node, it may load and activate the candidate-selection engine 150, vote-decision engine 155, and view-change engine 170. As another example, a Leader node may load and activate the candidate-selection engine 150, coordination engine 160, and signature engine 165. As explained herein, a node may be configured as more than one type of node, in which case the engines corresponding to the configured types may be loaded to the memory 115 and be activated.

Display 120 may be any device adapted to provide a visual output, for example, a computer monitor, an LCD screen, etc. The I/O interfaces 125 may include hardware and/or a combination of hardware and software for communicating information between the computing system 105 and a user of the computing system. The I/O interfaces may include, for example, devices such as a keyboard, mouse, trackball, audio input device, touch screen, infrared input interface, or any other input or output device. Display 120 is an optional component. Some nodes may include display 120 while other nodes may omit this device.

Network interface 130 may be a network adapter that includes hardware and/or a combination of hardware and software for enabling the computing system 105 to exchange information with other network nodes in the network 200. For example, the network interface 130 may include a wireless wide area network (WWAN) adapter, a Bluetooth module, a near field communication module, an Ethernet interface, a local area network (LAN) adapter, or any other network interface known in the art for communicating over a network. The network adapter 130 may transmit and receive information from another node in a P2P network.

Data Storage 140 may include one or more data storage devices, such as a computer hard disk, random access memory (RAM), removable storage, or remote computer storage, or an array of such memory devices. In some embodiments, the data storage 140 and memory 115 may share at least one memory device. In other embodiments, the data storage 140 and memory 115 may use separate memory devices. The data storage 140 may include Transaction storage 175, which may be configured to store transactions and/or transaction data, such as a TransactionBlock blockchain in a blockchain implementation. The data storage 140 may also include Key storage 180, which may be configured to store cryptographic key information and/or a KeyBlock blockchain in a blockchain implementation. While Transaction and Key information 175 and 180 are preferably stored in the data storage 140, they also may be stored in the memory 115, for example, as a duplicated copy for the purpose of access or processing efficiency. It should be understood that although the blockchain data structures are explained in the exemplary embodiments, any other data structure alternatively may be adopted, such as doubly-linked lists, heaps, trees, and so forth.

Figure 2:
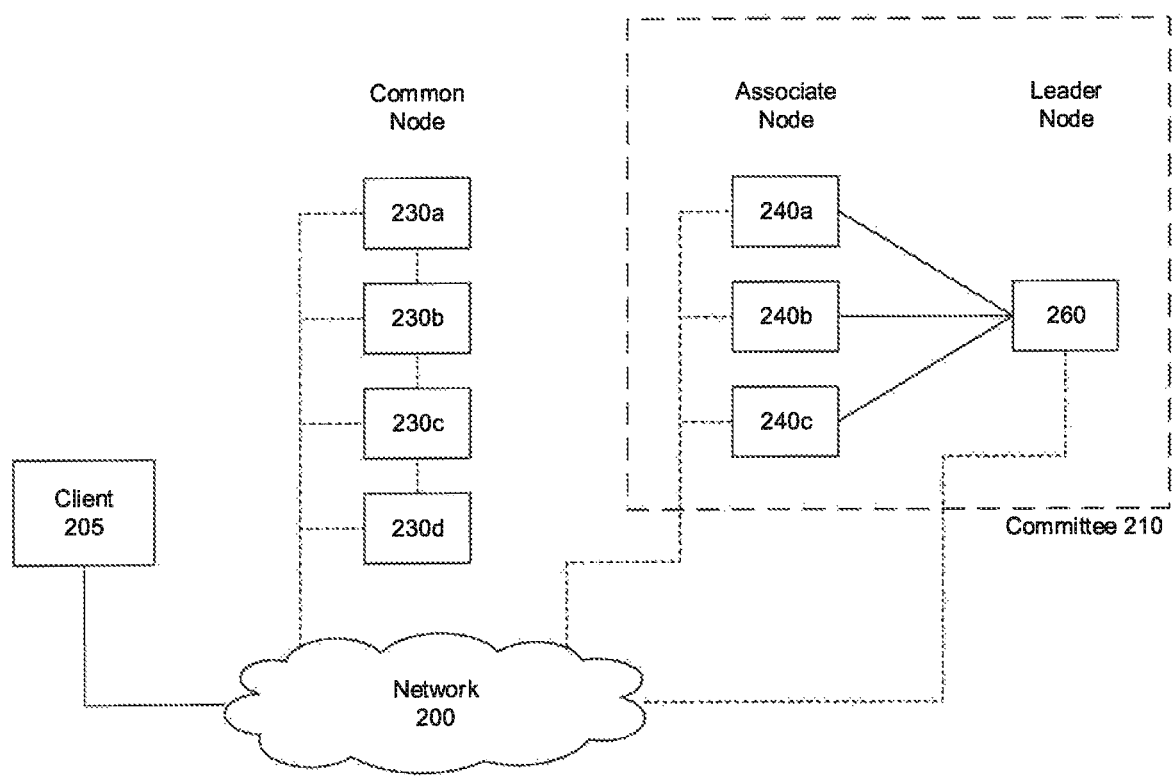
FIG. 2 is a schematic block diagram of an exemplary network architecture that may be used in accordance with certain disclosed embodiments of the invention.

FIG. 2 depicts a schematic block diagram of an exemplary network architecture that may be used in accordance with the disclosed embodiments of the invention. In FIG. 2, a network 200 contains a plurality of network nodes, each of which may be directly connected to at least one of the other nodes in the network. Accordingly, at least a portion of the network 200 may be configured as a P2P network, and in the disclosed embodiments, the network 200 also may be referred to as the P2P network. The network 200 includes one or more of each of the following types of nodes: Client node 205, Common node 230, Associate node 240, and Leader node 260. Each of the Associate nodes 240 and Leader node 260 are validator nodes that collectively form a Committee 210 of validator nodes. In some cases, the same physical device or devices may be configured to serve as different types of network nodes simultaneously. For example, a computer may be configured to function as a Client node 205 for certain users and also may otherwise function as a Common node in the network 200.

Client node 205 is a network node from which a user may submit a new transaction request. For example, the Client node 205 may provide a transaction request including data for a new transaction block that may be added to a blockchain. In the disclosed embodiments, for example, the user may be any person, software application, or other entity that can generate or otherwise provide a transaction request at the Client node 205.

Each Common node 230 may serve as a bridge, relay, or router configured to forward one or more transaction requests throughout the network 200. FIG. 2 illustrates exemplary Common nodes 230a-d, although there may be one or more Common nodes in the network. A Common node 230 may receive a transaction request from the Client node 205 or another Common node 230 in the network 200. In operation, a transaction request may be originated at a Client node 205, routed through the network 200 via one or more Client and/or Common nodes, until it is received by each of the validator nodes in the Committee 210. In accordance with the disclosed embodiments, a Common node 230 may be a candidate to become a new validator node in the Committee 210. Conversely, an Associate or Leader node may be removed from the Committee and, in some cases, may become a Common node.

In the Committee 210, the Leader node 260 coordinates with the other Associate nodes 240 to reach a consensus of a disposition (e.g., accept or reject) for each new transaction block and in some disclosed embodiments, broadcasts the consensus decision to one or more network nodes in the network 200. For example, in certain embodiments where Common nodes 230 maintain a copy of a current blockchain, the consensus decision from the Committee whether to add a new transaction block based on a received transaction request may be communicated to at least those Common nodes that store copies of the relevant blockchain. While FIG. 2 illustrates a set of Associate nodes 240a-c, those skilled in the art will appreciate there may be one or more Associate nodes in the Committee; there is preferably a single Leader node 260, although it is also contemplated that other embodiments (not shown) could employ more than one Leader node. In some embodiments, each Associate node 240 is configured to communicate directly with the Leader node 260. Further, as part of certain network events or procedures, an Associate node also may communicate directly with one or more other Associate nodes, such as in response to a "view change" event where the validator-node membership of the Committee is modified to select a new Leader node 260.

Further to the disclosed embodiments, the term of validator nodes in the Committee 210 may be limited. For example, in some embodiments, the Committee may have a predetermined term limit, e.g., measured in time or transactions, after which the specific validator nodes constituting the Committee may be updated or adjusted. One or more members 240 and 260 in the Committee 210 may be replaced at the end of each Committee term. In the disclosed embodiments, the term length for an Associate or Leader node may be defined as a fixed time interval, a predetermined number of transactions or events, or may be in response to one or more predetermined triggering events. In some cases, an Associate or Leader validator node may be removed from the Committee before the end of its term as a result of a discovered malfunction, period of non-responsiveness, malicious behavior, or other event or action deemed unacceptable for participation in the Committee.

Preferably, each Associate and Leader node stores information about each of other validator nodes in the Committee 210. For example, each of the Associate and Leader validator nodes may store the IP address of each of other validator nodes in the Committee. Each Associate and Leader node also may store public keys corresponding to each of the other validator nodes in the Committee. In some embodiments, the validator nodes may maintain "live" or "active" communications connections or sessions with each other and transmit signals from time to time to keep those connections or sessions active. Alternatively, the Associate and Leader validator nodes may not communicate with each other until one or more events trigger a need for such communications, such as in response to a view-change event or any other procedure to select a new Leader node in the Committee.

Figure 3A:
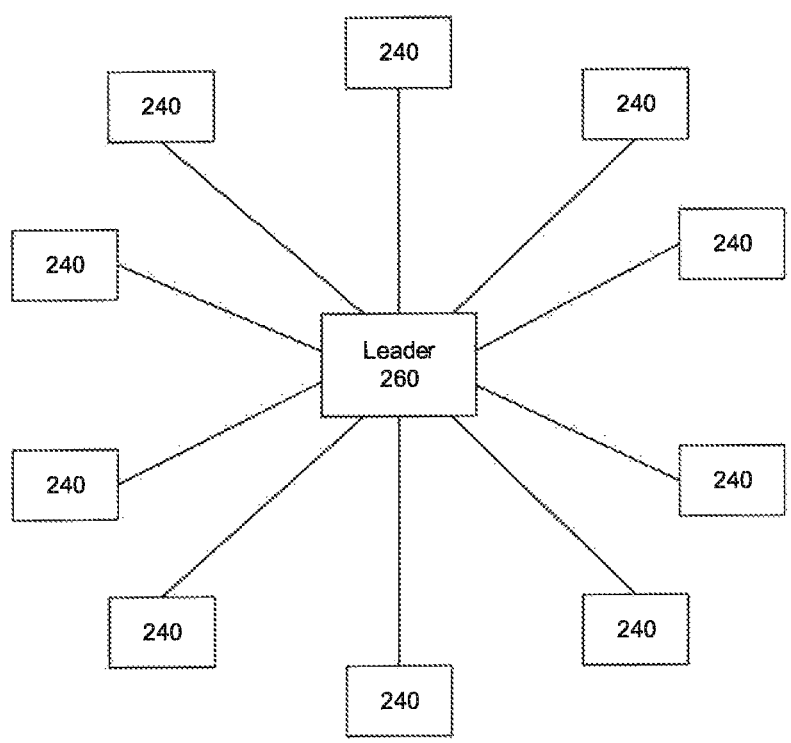
FIGS. 3A and 3B are schematic block diagrams of exemplary logical arrangements of validator nodes in a Committee that may be used in accordance with certain disclosed embodiments of the invention.
Figure 3B:
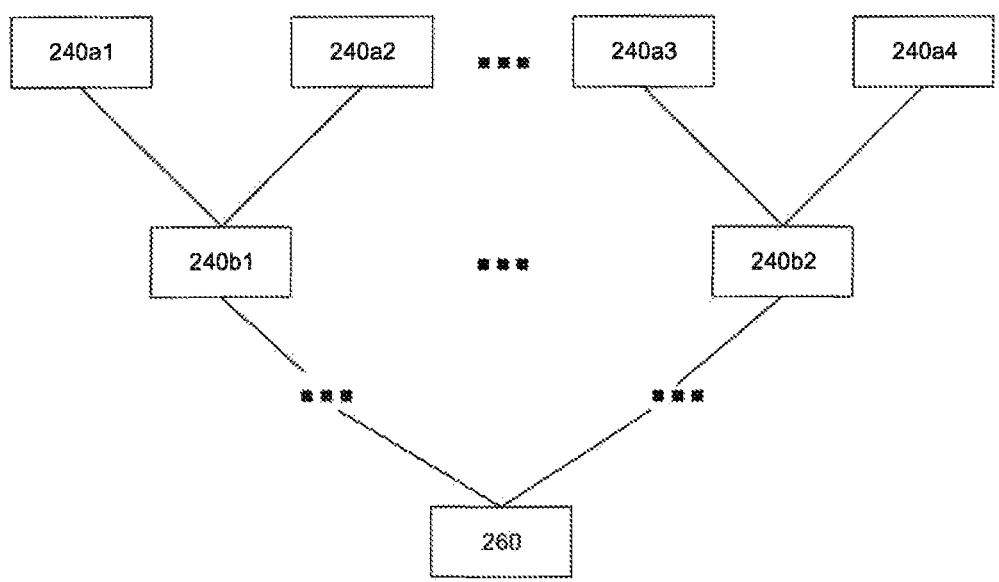

FIGS. 3A and 3B each depict a schematic block diagram of an exemplary network architecture of Committee 210 that may be used in accordance with the disclosed embodiments of the invention. In FIG. 3A, the Committee 210 includes a Leader node 260 and a plurality of Associate nodes 240, each of which may be directly connected to the Leader node 260. In the exemplary embodiment of FIG. 3A, the Associate nodes may be configured to communicate directly with the Leader node 260 until a certain event, such as a view-change event or procedure for changing the Leader node in the Committee, in which case each Associate node in the Committee may communicate with other Associate nodes in the Committee.

In the exemplary embodiment of FIG. 3B, the Committee 210 contains the Leader node 260, the plurality of Associate nodes 240a1, 240a2, 240a3, 240a4, 240b1, 240b2, and one or more other Associate nodes arranged in a tree structure. Each Associate node may be logically connected in the tree structure with at least one parent and/or child Associate nodes. For example, in FIG. 3B, Associate nodes 240a1 and 240a2 are connected with their parent Associate node 240b1, and Associate nodes 240a3 and 240a4 are connected with their parent Associate node 240b2. Associate nodes 240b1 and 240b2 are further connected with one or more additional levels of parent nodes, which eventually are connected to the Leader node 260.

In some embodiments, each parent node in the exemplary tree structure of FIG. 3B is connected with same number of child nodes, and each Associate node other than the root (i.e., the Leader node 260) may have same number of sibling nodes; in other embodiments, the number of child nodes of each parent node may vary. The number of levels in the tree structure and the number(s) of nodes at each level also may vary depending on the implementation of the Committee. Further, the arrangement of the validator nodes in the tree structure may be ordered, for example, where each node in the tree is assigned with a sequence number. Using an ordered data structure, such as an ordered tree in FIG. 3B, for the validator nodes may form a first-in, first-out queue that can serve various purposes described further in the disclosed embodiments.

In some embodiments, the Associate and Leader nodes may each store information about each of all other validator nodes in the Committee 210. In other embodiments, each validator node may store information about only some of the other validator nodes in the Committee 210. For example, an Associate or Leader validator node may be configured to only store information about its parent node, child nodes, sibling nodes, or combinations of such nodes, as defined by the logical arrangement of nodes in the exemplary tree structure shown in FIG. 3B. The stored information may include one or more of the IP address of another validator node, the public key corresponding to that other validator node, and/or other information that may help identify that other validator node. In some embodiments, a validator node may maintain live connections with its parent and child nodes and transmit pulse signals or other messages from time to time, for example, to keep those connections active. Alternatively, a validator node may not communicate with any of the other validator nodes until a certain event, such as a view-change event or procedure for changing the Leader node in the Committee.

Figure 4:
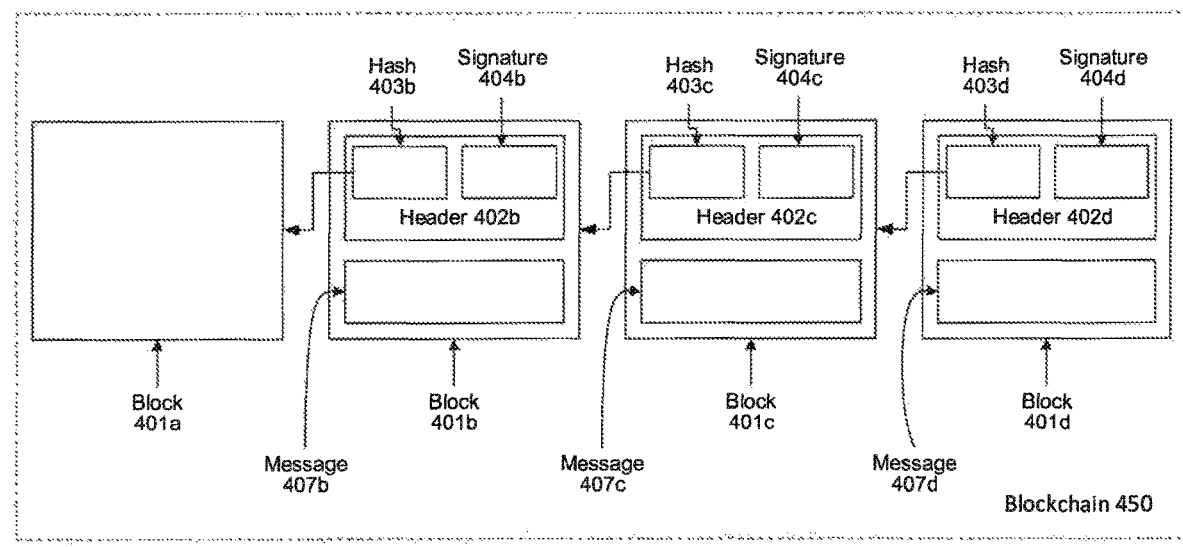
FIG. 4 is a schematic block diagram of an exemplary blockchain that may be used in accordance with certain disclosed embodiments of the invention.

FIG. 4 illustrates a schematic block diagram of an exemplary blockchain 450 that may be used in accordance with the disclosed embodiments. Copies of the blockchain 450 may be maintained by many different nodes (e.g., Common nodes 230, Associate nodes 240, or Leader node 260) in the network 200. The exemplary blockchain 450 comprises one or more blocks, such as blocks 401a-401d. A block 401 may include at least one message, such as message 407b, 407c, or 407d. In this context, the message contains any type of data, such as transaction data that may have been generated by one or more Client nodes in the network.

A block also may include a header, such as the header 402b in block 401b. The header may include, for example, at least one of: a hash value 403b of a previous block in the blockchain 450, a digital signature 404b, a hash value (not shown) based on at least one message 407b, and a timestamp (not shown), which may indicate a date and/or time when the block was added to the blockchain. In some embodiments, the header may be digitally signed with a cryptographic key of an authorized system, and the digital signature may be included in the header. Preferably, this digital signature may be verified using a public key of the authorized system, which may be a node in the network or any other trusted authority.

In accordance with some of the disclosed embodiments, there may be at least two types of blockchains 450: a KeyBlock blockchain and a TransactionBlock blockchain. Although the two blockchains are described separately below, alternatively they could be merged into one blockchain including multiple types of blocks: KeyBlock blocks (KBs) and TransactionBlock blocks (TBs). In some embodiments, there may be a third type of blockchains 450: a CommitteeBlock blockchain.

Figure 5A:
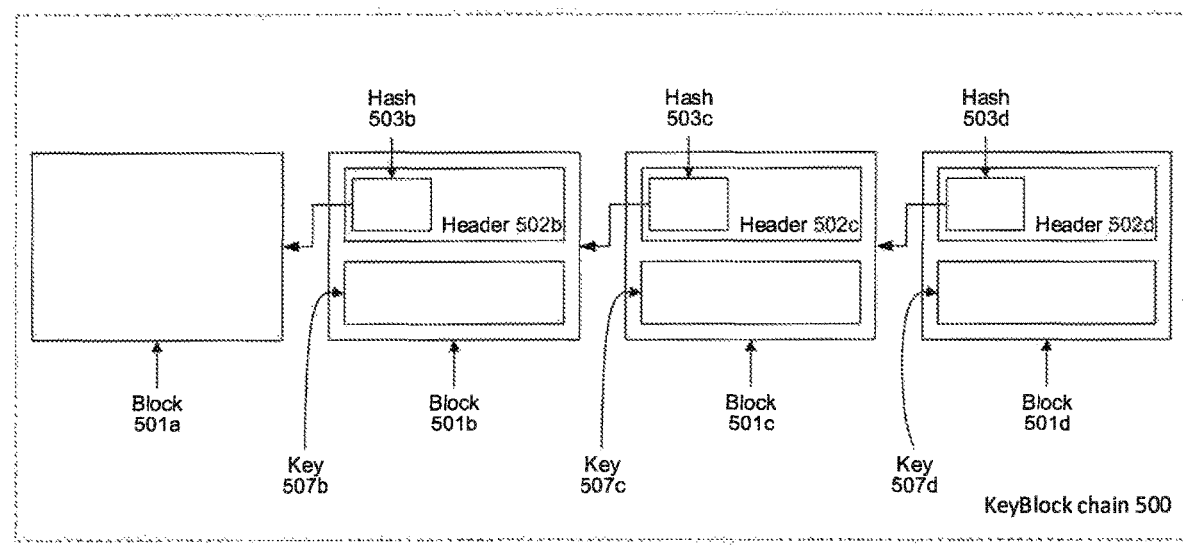
FIG. 5A depicts an exemplary KeyBlock blockchain that may be used in accordance with certain disclosed embodiments of the invention.

FIG. 5A depicts an exemplary KeyBlock blockchain 500 that may be used in accordance with certain disclosed embodiments. In some embodiments, the KeyBlock blockchain is formed using individual blocks, such as the exemplary Keyblock blocks 501a, 501b, and 501c, which store one or more cryptographic public keys 507b, 507c, and 507d that can be used by at least some of the network nodes in network 200. Each of the KeyBlock blocks may include a header portion containing a hash value, which may be digitally signed in some embodiments, of one or more preceding blocks in the KeyBlock blockchain, such as the hash values 503b, 503c, and 503d within the KeyBlock block headers 502b, 502c, and 502d. In an exemplary embodiment, each Keyblock block (KB) 501 in the KeyBlock chain may correspond to a different term of the Committee 210. The message data stored in each KB 501 may include one or more public keys for the validator nodes in the Committee 210. When a new Committee 210 is formed, or the validator nodes in the Committee are changed or reassigned, a new block 501 is added to the KeyBlock chain corresponding to the new composition of the Committee. Particularly, a KeyBlock block 501 preferably stores a public "epoch" key, which is a cryptographic key that is used by the validator nodes during the term of the corresponding Committee 210. In some embodiments, each block 501 in the KeyBlock chain also may store the public keys of the individual validator nodes in the block's corresponding Committee 210.

Figure 5B:
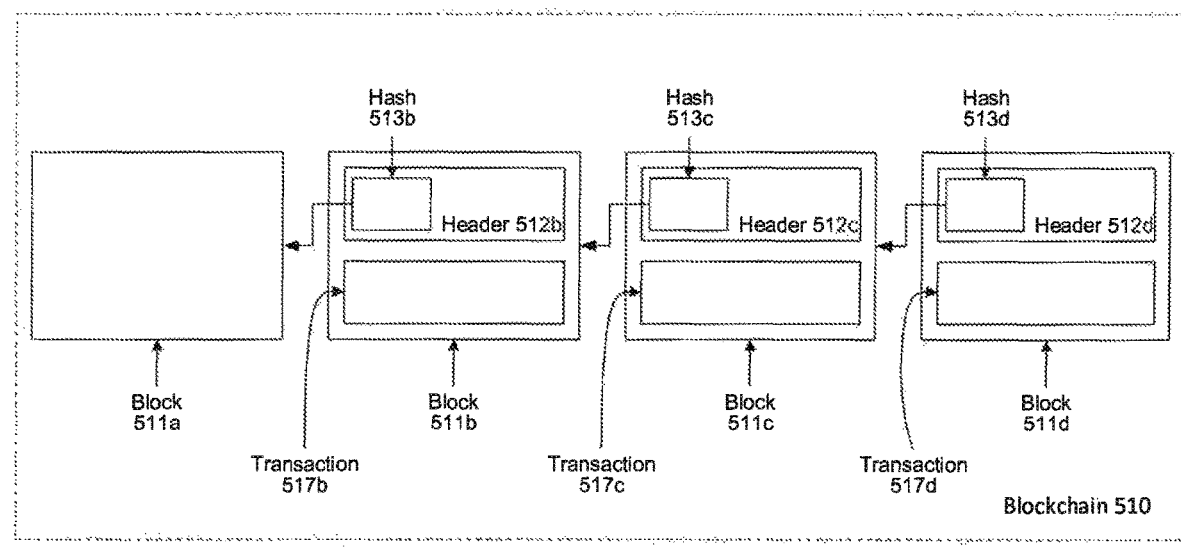
FIG. 5B depicts an exemplary TransactionBlock blockchain that may be used in accordance with certain disclosed embodiments of the invention.

FIG. 5B depicts an exemplary TransactionBlock chain 510 that may be used in accordance with the disclosed embodiments of the invention. A TransactionBlock chain is a blockchain in which individual blocks, such as exemplary TransactionBlock blocks 511a, 511b, 511c, and 511d, store messages containing any type of transaction data that may be processed by the system. A TransactionBlock block may contain transaction data, such as Transactions 517b-d, corresponding to one or more transactions in the network. In this context, the transaction data is any data that may be stored in the blockchain 510, and is not limited to any particular type of transaction data. In accordance with the disclosed embodiments, each block 511 in the TransactionBlock blockchain 510 stores information about one or more transactions processed by the Committee. For example, a transaction may correspond to currency or electronic funds transferring, where the information may include payer account information, payee account information, amount to be transferred, and/or the type of currency. By way of another example, a transaction may be a legal agreement, such as a patent assignment agreement, where in such an example the information may include the patent number, the assignor and the assignee of the patent. It may also include any witness that has witnessed the transaction or may include the entire contract document. The transaction data in the TransactionBlock blocks (TB) 511 generally may correspond to data for one or more financial, legal, commercial, collaborative, or any other types of transactions.

Further to the disclosed embodiments, the TBs 511 are generated by the Committee 210. The Committee 210 may generate a TB in certain time intervals. For example, the Committee 210 may generate a TB every ten minutes or other predetermined time interval, and in this example, the TB may store data for all transactions that the Committee has processed during that time interval. In some embodiments, the Committee 210 may generate a new TB when it has received a certain amount of transaction requests or has processed a certain number of transactions. In some embodiments, the Committee may generate a new TB 511 in the TransactionBlock blockchain 510 when a certain amount of transactions are processed or when a certain period of time has lapsed. In yet other exemplary embodiments, a new TB is generated when the size of the transaction data to be included in a TB reaches a threshold size. For example, a TB may be generated as a result of the Committee having received a predetermined number, such as 1024, currency transactions, whereas another exemplary implementation may generate a new TB when the Committee has received a different number, such as 10, patent transactions to include in a patent assignment, since the data for each patent assignment transaction may be larger than the data required for a currency transaction. Preferably, the TransactionBlock blockchain may be modified in the same manner that the KeyBlock blockchain is modified in the steps described with reference with FIGS. 9-11.

Figure 5C:
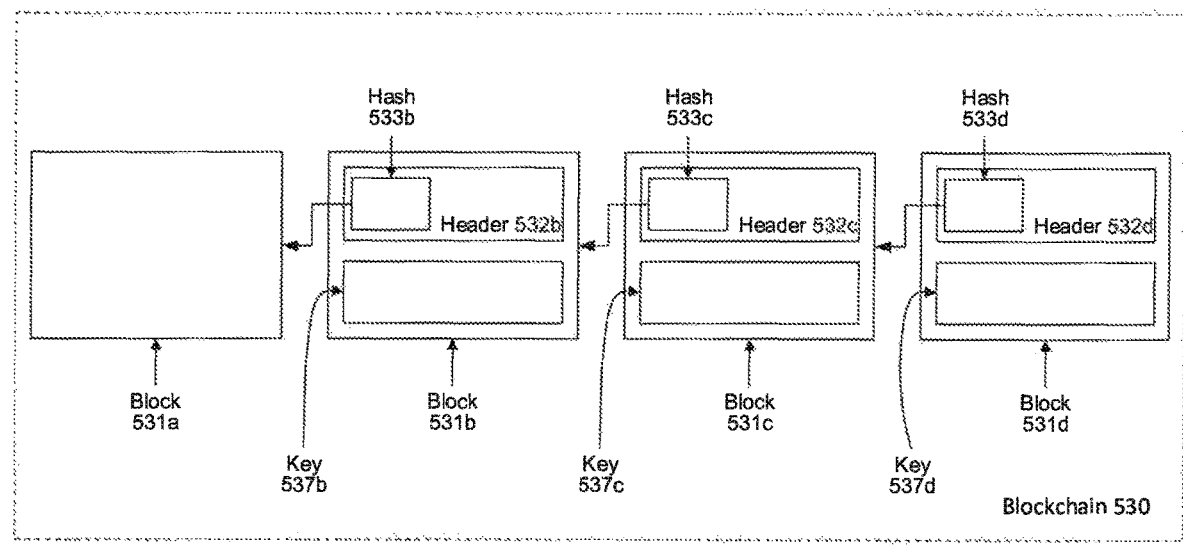
FIG. 5C depicts an exemplary CommitteeBlock blockchain that may be used in accordance with certain disclosed embodiments of the invention.

FIG. 5C depicts an exemplary CommitteeBlock blockchain 530 that may be used in accordance with certain disclosed embodiments of the invention. In some embodiments, the CommitteeBlock blockchain contains individual blocks, such as exemplary CommitteeBlock blocks (CB) 531a, 531b, 531c, and 531d, that store information of members of Committee 210. For example, the CBs 531b-d may store cryptographic key information 537b-d for members of the Committee 210 and also may comprise block headers 532b-d storing hash values 533b-d of one or more preceding CBs in the blockchain.

In some exemplary embodiments, each CB 531 in the CommitteeBlock chain 530 may correspond to a different KB 501 in the KeyBlock chain 510 (FIG. 5B), in which case each CB contains information for the same term of the Committee 210 as its corresponding KB. Accordingly, when a new KB 501 is added to the KeyBlock chain corresponding to a new composition of the Committee 210, a new CB 531 is also added to the CommitteeBlock chain 530. In some embodiments, the message data stored in the new KB 501 includes a hash of its corresponding new CB 531. In some embodiments, each validator node may generate CB 531 when verifying the new PKB-1. Each validator node may calculate a hash value of the CB and compare it with the hash value of CB stored in the PKB-1.

Further, in some embodiments, the CommitteeBlock chain 530 may be encrypted and/or stored separately from the other blockchains in the system. The encrypted message data of each CB 531 is only accessible to validator nodes in the Committee 210 during a term corresponding to the CB. In some other embodiments, each CB 531 may be transmitted among validator nodes without encryption.

The message data stored in each CB 531 may include information of the validator nodes in the Committee 210 during the corresponding term. In some embodiments, the message data stored in each CB 531 may include the IP addresses (or other network addresses or network-node identifications) of all the validator nodes in the Committee 210 during the term.

Figure 6:
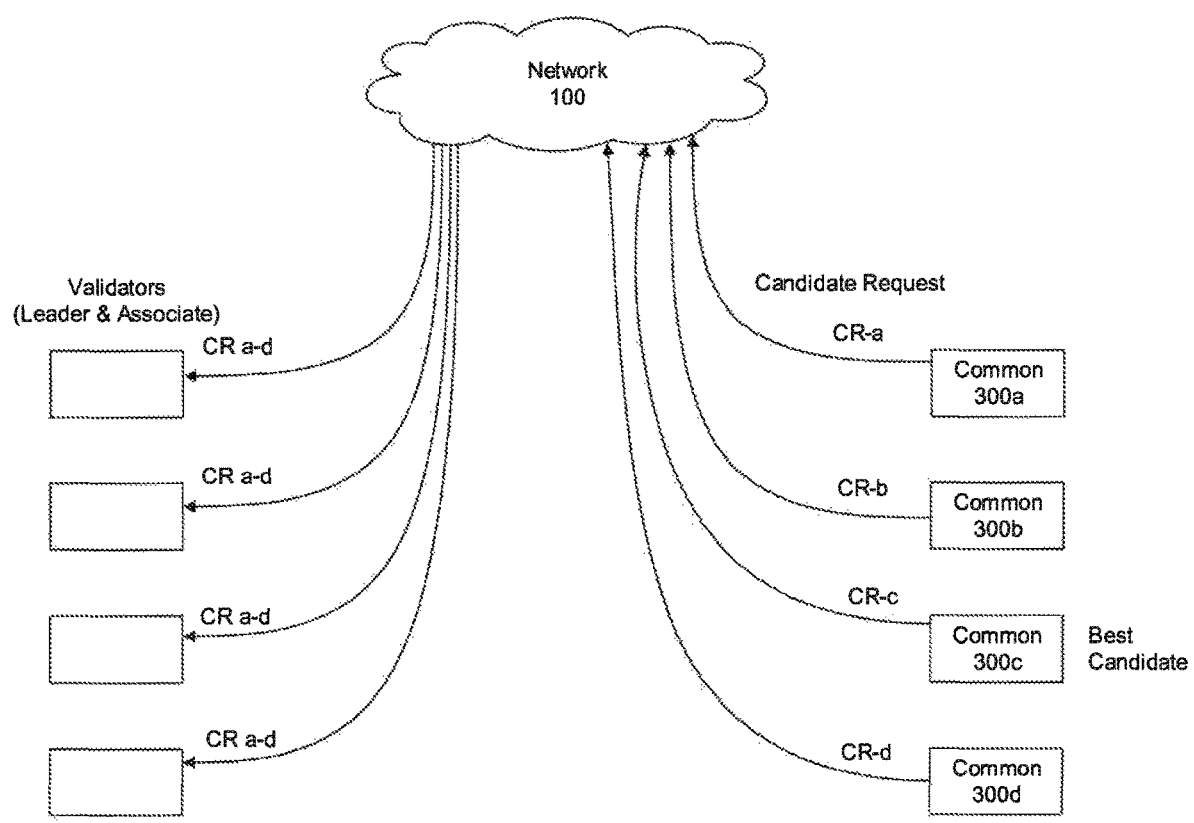
FIG. 6 depicts exemplary communications that may be exchanged among network nodes in an exemplary process for reconfiguring the membership of nodes in a Committee in accordance with certain disclosed embodiments of the invention.

FIG. 6 depicts exemplary communications that may be exchanged among network nodes in network 200 using an exemplary process for reconfiguring the membership of validator nodes on the Committee 210 in accordance with certain disclosed embodiments. The first stage of reconfiguring membership of the Committee 210 may be referred to as a "campaign," where Common nodes 230 may compete or otherwise request to become a new validator node in the Committee 210. After a new campaign has started, a Common node 230 may submit a request ("candidate request") to become a new validator node to at least some of the other nodes in the P2P network 200, and the request is received by at least one of the validator nodes (Associate nodes 240 and Leader node 260) in the Committee 210. Multiple candidate Common nodes 230, for example nodes 300a, 300b, 300c, and 300d in FIG. 6, may send their respective candidate requests CR-a, CR-b, CR-c, and CR-d, to the validator nodes in the Committee after the campaign is started. In some embodiments, the campaign to select a new validator node may end based on the expiration of a certain time period, triggering event, or reception of a message indicating an end of the campaign in the P2P network 200. For example, the campaign may end based on the triggering event that the number of new TBs added to the TransactionBlock blockchain 510 during the term of the current Committee 210 (i.e., since the previous new block addition to Keyblock chain) has exceeded a threshold number. In other exemplary embodiments, however, a campaign may be ongoing without a predetermined termination. In some disclosed embodiments, a candidate Common node 230 may encrypt its candidate request using an epoch public key and transmit the encrypted candidate request through the P2P network. The candidate Common node 230 may be configured to only encrypt a portion of information in the candidate request, such as its IP address. In such embodiments, because the corresponding epoch private key is known only to the validator nodes, only the Associate and Leader nodes may successfully decrypt the received candidate request. But the Common nodes can verify at least a portion of information stored in the candidate request because the corresponding epoch public key is known by all the Common nodes, as described in detail with reference to step 740. For example, in a POW network, a nonce value stored in the candidate request may not be encrypted so the Common nodes can access the nonce value by using the epoch public key and verify if the candidate request is valid under the POW protocol. Each Associate and Leader node 240 and 260 in the Committee 210 selects what it considers is its preferred candidate to join the Committee as a new validator node based on the candidate requests it has received during the campaign.

A candidate request may include a proof of work (POW) or a proof of stake (POS) or a proof of authority (POA), or a combination of any of the above. Based on the POW, POA, or POS data in the received candidate requests, each Associate and Leader validator node determines a "best" (preferred or optimal) candidate Common node to join the next Committee. In accordance with the disclosed embodiments, each of the Leader node and Associate nodes preferably uses the same criteria for selecting the best candidate Common node to join the next Committee.

Figure 7:
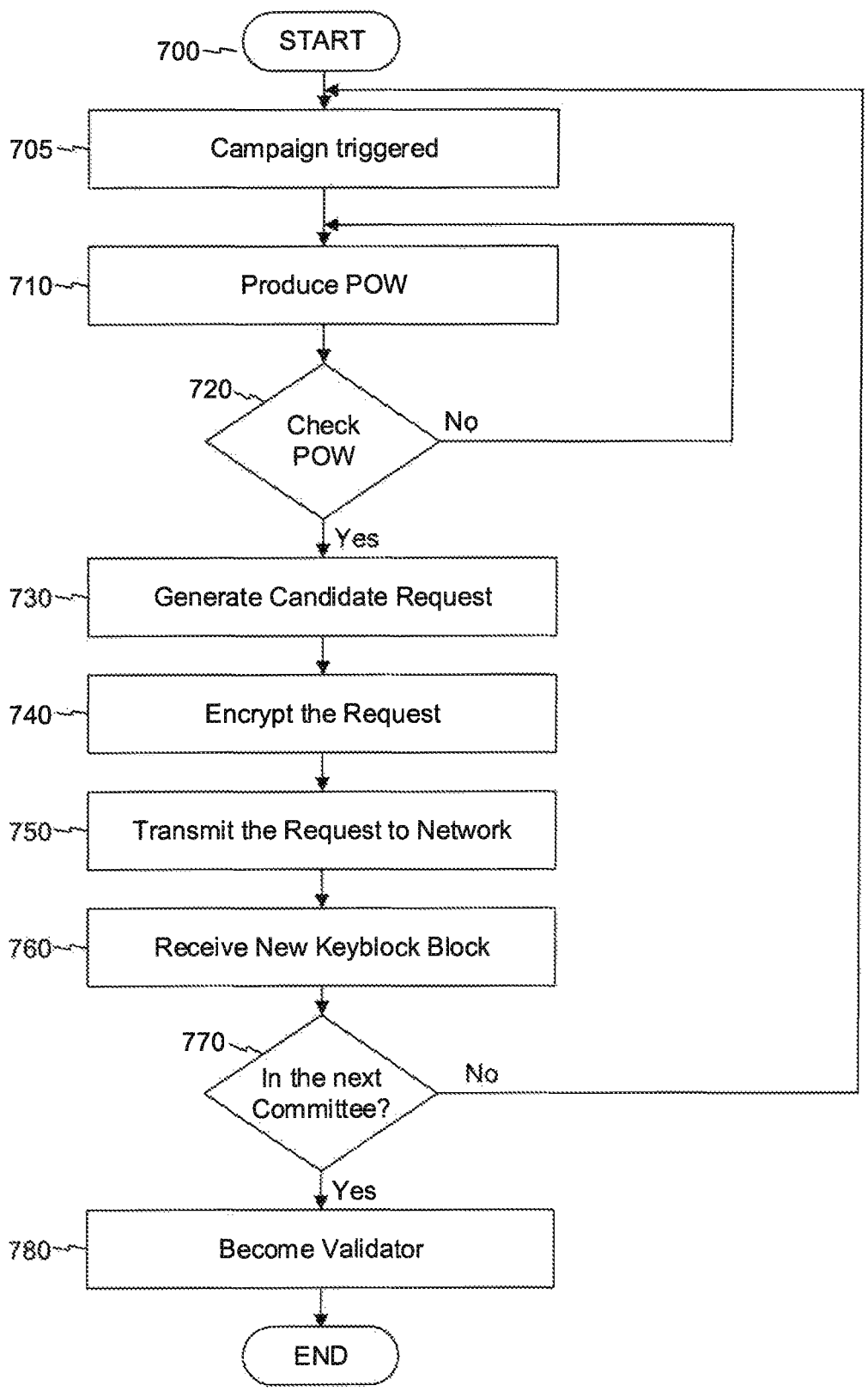
FIG. 7 depicts a flowchart showing an exemplary sequence of steps that may be performed by a Common node using a reconfiguration process in accordance with certain disclosed embodiments of the invention.

FIG. 7 depicts a flowchart showing a sequence of steps that may be performed by a Common node 230 according to a first stage of the exemplary reconfiguration process in accordance with certain disclosed embodiments. In this context, the Common node is a candidate to become a new Associate validator node in the Committee 210. The sequence starts at step 700 and proceeds to step 705, where a campaign is triggered. There are several ways that a campaign may be triggered in the network 200. In some embodiments, a campaign is always triggered, in which case Common nodes may send candidate requests at any time. For example, in such exemplary embodiments, a Common node may create a new candidate request whenever it has completed one or more POW challenges. In some embodiments, a campaign may be triggered by certain events, such as a failure of a validator node, an update of a network protocol, or any other predefined event(s). In some embodiments, a campaign may be triggered by a certain time interval. In some embodiments, at least one of the validator nodes in the Committee may communicate the start of a new campaign to the Common nodes in the network.

In some disclosed embodiments, a Common node 230 operates in the campaign by producing at least one proof of work, which is a piece of data that is difficult to produce but easy for others to verify. For example, a POW on message m may include a hash value of the combination of message m plus a nonce value, where the resulting hash value may have to meet certain conditions, for example, being smaller than a threshold value.

In one illustrative example, a candidate Common node 230 may produce its POW (step 710) by repeatedly generating a hash value using different nonce values and each time checking whether the generated hash value using the selected nonce value alone or in combination with a message m satisfies a predetermined condition (step 720). If the condition is satisfied, and thus a valid POW is produced, the candidate Common node proceeds to the next step 730. In this example, many algorithms may be used to generate the hash value. For example, in the campaign, the validator nodes may require the hash value to be produced using a SHA-256 algorithm applied to a message m and a nonce value, where the hash value must be smaller than a threshold, such as less than $2^{240}$. Other algorithms could also be used for producing the POW, such as but not limited to Scrypt, Blake-256, CryptoNight, HEFTY1, Quark, SHA-3, scrypt-jane, scrypt-n, and combinations thereof. More generally, the validator nodes in the Committee may require a POW based on any arbitrary selected piece of verifiable information. For example, the network may be configured to require candidate Common nodes 230 to provide a POW based on the first 80 bytes of a current transaction block or on a hash value of the previous block. In another exemplary embodiment, the network may be configured to require candidate Common nodes 230 to provide a POW based on a snapshot of the current system state. In yet other exemplary embodiments, the candidate Common nodes 230 may run the campaign by producing a proof of stake, for example, based on their age, value, or other weighting algorithm(s). In some other embodiments, the candidate Common nodes 230 may run the campaign by producing POA, POS and/or POW data that are included in their candidate requests.

At step 730, the candidate Common node 230 generates a candidate request. As noted, the candidate request may include a POW, POA, or POS or a combination thereof, and it preferably also includes information about the Common node 230 itself such as one or more of its Internet Protocol (IP) address or other network address, a network or user identifier, a network or user account number, a public key for the candidate Common node, and/or any other relevant information that may be used for identifying the node. The Common node also may digitally sign at least some of the information in its candidate request using its private key.

At step 740, the candidate Common node 230 preferably encrypts a portion of information stored in the generated candidate request with an epoch public key that is known to all of the validator nodes. The portion of information encrypted may include the IP address of the candidate Common node 230. In some embodiments, the epoch public key may be stored in a current KB 511 of a Keyblock blockchain, which the Common node has accessed to obtain the epoch public key. The encryption may utilize any appropriate encryption algorithm, such as but not limited to SHA3, ECC25519, ED25519, etc. An encryption algorithm is preferably selected so the candidate Common node may encrypt information using the public epoch key, but each of other network nodes in the P2P network 200 cannot decrypt the information unless it knows the epoch private key.

At step 750, the candidate Common node 230 transmits its encrypted candidate request to at least one adjacent ("peer") node in the P2P network 200, wherein the other nodes in the network 200 relay the candidate request to distribute it throughout the network. The candidate request may reach at least one validator node, which in turn makes a decision on whether to add the Common node 230 to a current candidate "pool" (e.g., a list of candidate Common nodes requesting to join the Committee) based on the candidate request it received, e.g., using an exemplary process described with reference to FIG. 8.

At step 760, the candidate Common node 230 may receive a new KeyBlock block (in this example called "KB-1" to distinguish it from KBs already part of the KeyBlock chain) that may be created by the Leader node, e.g., using an exemplary process described with reference to FIG. 10. The KB-1 corresponds to the next term of the Committee 210 and contains the new validator-node membership of the Committee. KB-1 contains one or more public keys for each of the validator nodes in the next term of the Committee 210. Preferably, KB-1 stores a public "epoch" key, which is a cryptographic key that will be used by the validator nodes during the next term of the Committee 210, e.g., after the membership of the Committee has been modified to account for any new validator nodes and/or any validator nodes from the Committee's previous term that have been removed. In some embodiments, the public epoch key may also be used by the Common nodes. In some embodiments, KB-1 also may store the public keys of the individual validator nodes in the KB-1's corresponding Committee 210.

At step 770, after receiving the new KB-1, the candidate Common node 230 may determine whether it is in the next term of the Committee 210 based on the composition of the Committee corresponding to the information stored in the KB-1. If the candidate Common node 230 determines that it is in the next term of the Committee 210, it proceeds to step 780. If the candidate Common node 230 determines that it is not in the next term of the Committee 210, it returns to step 705 where another campaign may be triggered and then the process may proceed to the next steps with updated information from KB-1.

If the candidate Common node 230 determines that it is included in Committee membership in KB-1, then at step 780, the candidate Common node becomes a validator node. In some exemplary embodiments, the candidate Common node 230 may not become a Leader node in the first one or more terms of the Committee 210 after it becomes a validator node based on predetermined rules. In other exemplary embodiments, the candidate Common node 230 may be permitted to become the Leader node or an Associate node after joining the Committee.

Figure 8:
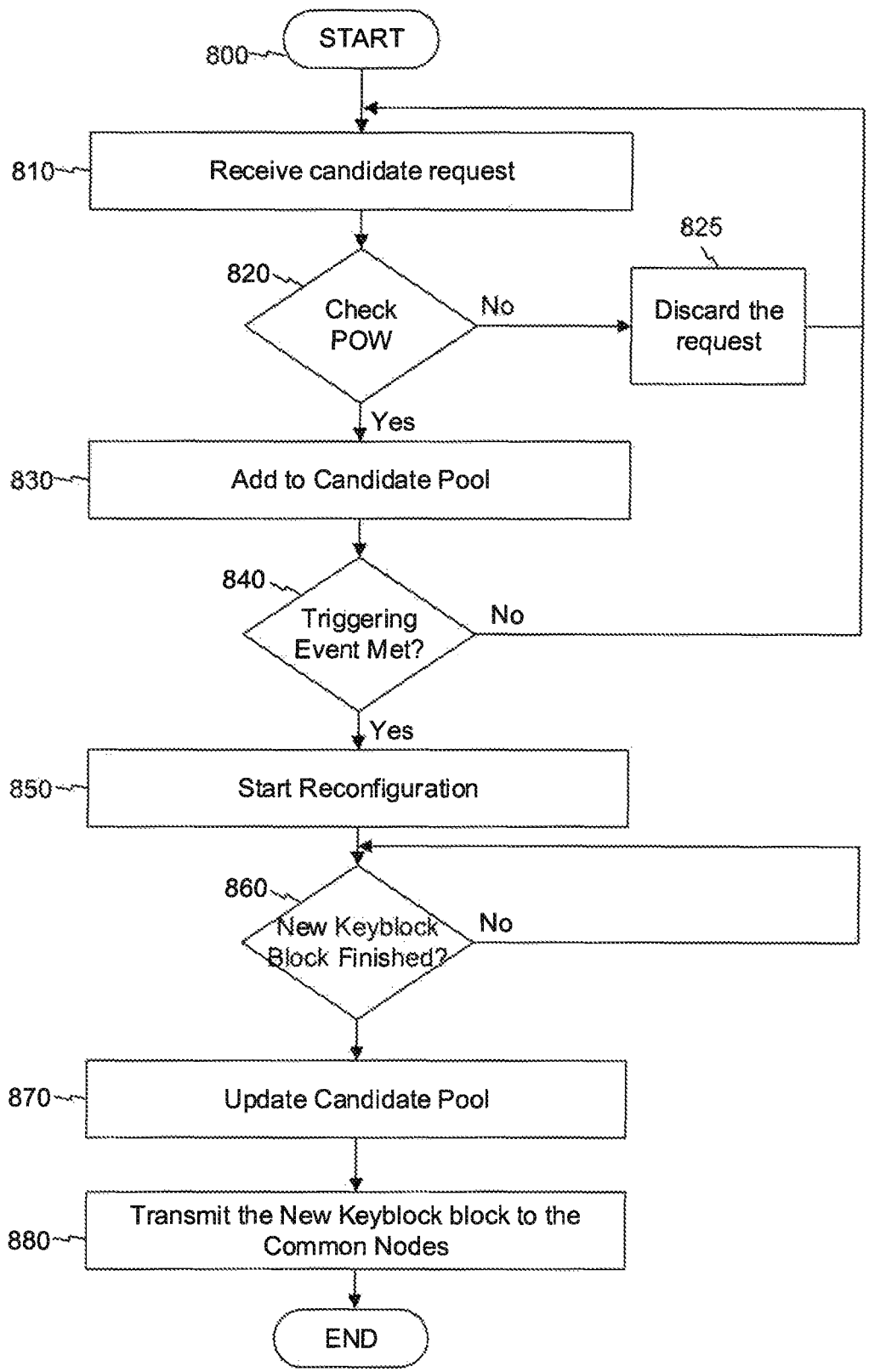
FIG. 8 depicts a flowchart showing an exemplary sequence of steps that a validator node may perform as part of the process for reconfiguring the membership of nodes in a Committee in accordance with certain disclosed embodiments of the invention.

FIG. 8 depicts a flowchart showing a sequence of steps that a validator node may perform as part of the first stage of an exemplary process for reconfiguring membership of the Committee 210 in accordance with certain disclosed embodiments. With respect to this exemplary embodiment, the Leader node 260 and Associate nodes 240 perform substantially same steps in the first stage of the reconfiguration process 800. For this reason, the exemplary sequence of steps in FIG. 8 will be generally described below as steps performed by a validator node, without distinguishing steps performed by Associate nodes relative to the Leader node.

At step 810, a validator node receives a candidate request that had been sent from one of the Common nodes 230 in the network 200. At step 820, the validator node verifies the candidate request. In some embodiments, the validator node verifies the candidate request by decrypting it using an epoch private key, e.g., that it previously received from the Leader node 260 or it previously generated if the validator node is the Leader node or it obtains from the current CB of the CommitteeBlock chain 530. If the received candidate request is determined to be valid based on one or more of a POW, POS, or POA at step 820, then the validator node adds the candidate Common node corresponding to the candidate request to a candidate pool at step 830. In this exemplary embodiment, the validator node performing the process 800 maintains its own candidate pool, although in other exemplary embodiments the candidate pool may be accessed and/or modified by one or more validator nodes in the Committee. If the candidate Common node's candidate request is not determined to be valid at step 820, then the validator node discards the received candidate request at step 825 and the process returns to step 810. In some embodiments, as will be described in detail with reference to step 1105, a Heartbeat monitor may start right after the campaign starts, or at a certain point before the start of the reconfiguration.

At step 840, the validator node may determine whether a process of request-fulfillment process may begin. The process may preferably begin following the end of the campaign of selecting a new validator node. As described in detail with reference to FIG. 6, the campaign may end based on the expiration of a certain time period, triggering event, or reception of a message indicating an end of the campaign in the P2P network 200. In some embodiments, the triggering event may be that the candidate pool contains a sufficient number of candidate Common nodes (or validated candidate requests), for example, exceeding a threshold number. The determination at step 840 may be related to step 1105. In some embodiments, as will be described in detail with reference to step 1105, if the Heartbeat monitor is running and the validator node determines that it has received a sufficient number of candidates, and if the validator node does not receive a PKB-1 from the Leader node 260 by the end of a time period, the validator node may transmit a request for view change to the Committee 210. The validator node will transmit to the Leader node the candidate requests corresponding to the Common nodes that the validator node has added to the candidate pool. If the validator node determines, at step 840, that it has not received a sufficient number of candidates, it may return to step 810 and receive and process more candidate requests. In some embodiments, if the validator node has determined that it has received a sufficient number of candidates, it may stop adding new candidates into its candidate pool and thereby stop sending new candidate requests to the Leader node. In some embodiments, the Common nodes may perform the same process as the validator nodes with respect to steps 810 to 840, such that each Common node also validates and sends to the Leader node 260 its received candidate requests and may have a candidate pool like the validator nodes.

The size of the candidate pool may vary. In some exemplary embodiments, the size of the pool is one, which means the validator node only sends the Leader node a single candidate request corresponding to the first candidate Common node that the validator node has validated at step 820. In some exemplary embodiments, the size of the candidate pool may be a number selected based on the POW, POA and/or POS being evaluated, or otherwise may be selected based on experience with the particular POW, POA, or POS used to validate candidate requests at step 820. In other embodiments, the size of the candidate pool may be indefinite. In yet other embodiments, the validator nodes may accept candidate requests for the duration of a predetermined time interval. For example, each validator node may accept candidate requests within ten minutes after it receives its first candidate request. In some embodiments, the validator nodes may not perform step 840, and instead send the Leader node any number of Common nodes from its candidate pool.

At step 850, the reconfiguration process is started by the Leader node. Steps 850-880 will be described in detail in FIGS. 9, 10, and 11.

Because it may take some time for a candidate request to be transmitted from a candidate Common node to the validator node through the P2P network, in some embodiments, the receiving validator node may wait at least a minimum amount of time before deciding which candidate Common node will be its best candidate, so an earlier-generated but later-received candidate request can be considered, reducing the impact of the P2P network delay to the validator node's decision. In some embodiments, the validator node's selection may be based on elements other than, or in addition to, POW, such as POS or POA. In some embodiments, the validator node may use an equation or formula, such as a weighted equation based on different weights assigned to one or more POW, POS, or POA received with the candidate request, to select a best candidate Common node to send to the Leader node. In accordance with the disclosed embodiments, the validator nodes preferably employ the same criteria for selecting a best candidate Common node to join the next Committee.

At step 860, the validator node determines whether the Leader node has added a new KB-1 to the KeyBlock blockchain, for example, before a predetermined condition has been reached. In some embodiments, the predetermined condition can be a certain period of time or a certain number of new TBs added to the TransactionBlock blockchain. During the reconfiguration process, there may be one or more "timeout" determinations, which will be described in further detail with reference to FIGS. 10 and 11. If the validator node determines that a KB-1 has not been added to the KeyBlock blockchain before a predetermined condition has been reached, it will generate a new view-change message which it sends to the other validator nodes. If the validator node determines that a new KB-1 has been added to the KeyBlock blockchain before a predetermined condition has been reached, the validator node will proceed to step 870.

At step 870, the validator node updates the candidate pool. In some embodiments, the validator node may clear all candidate Common nodes from its candidate pool. In some embodiments, the validator node may decide whether to remove a candidate Common node from the candidate pool based on whether that Common node had been added to the candidate pool based on a validated POW, POA and/or POS. In some embodiments, for example, the validator node may remove all Common nodes from the candidate pool that had been added to the pool based on their POW candidate request; in some exemplary embodiments, the validator node may keep all Common nodes that were added to the pool based on a POS determination and update the stake of each such Common node based on their remaining stake percentage in the pool.

Figure 9:
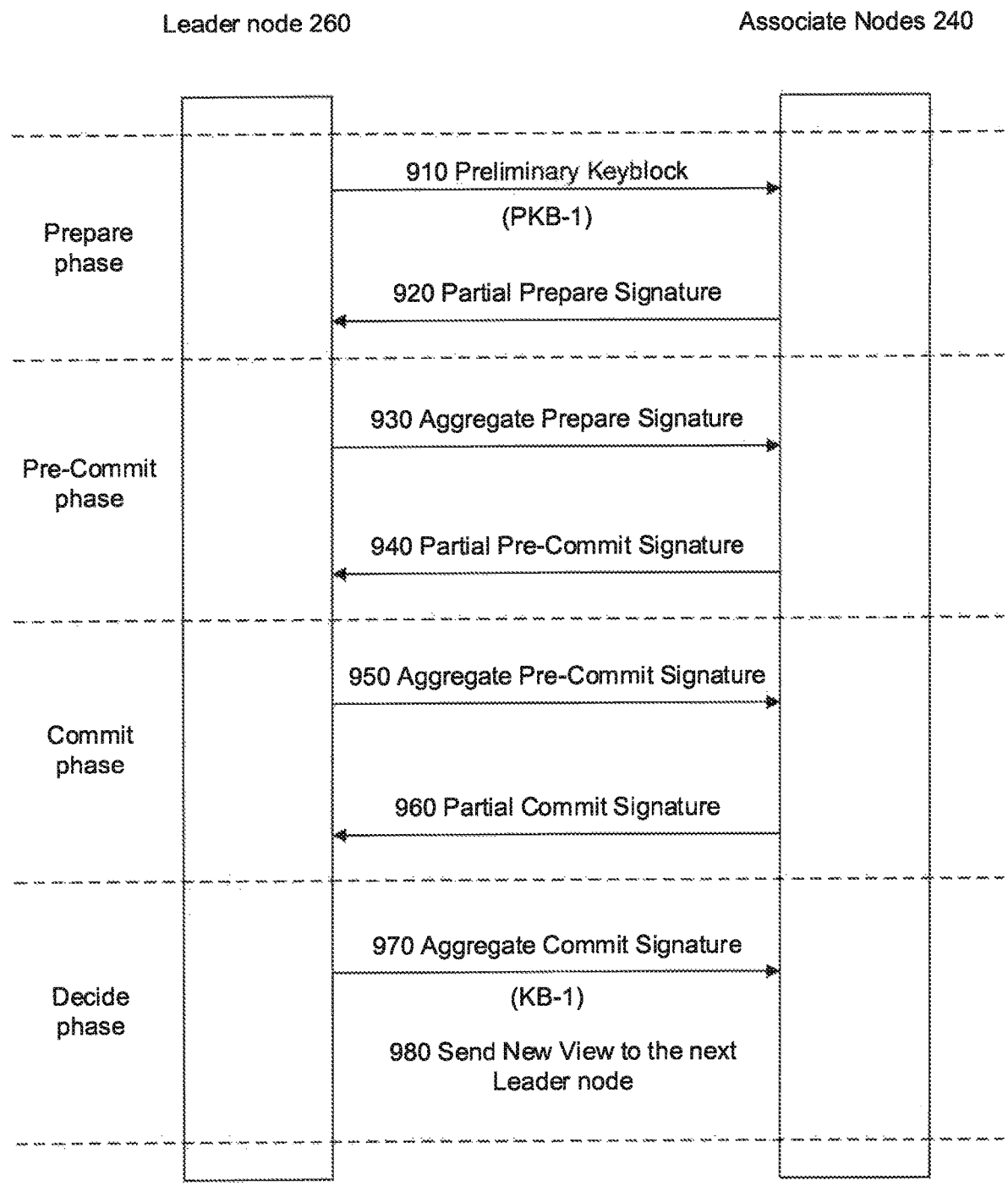
FIG. 9 depicts an exemplary exchange of communications among validator nodes that may be used for reconfiguring the membership of nodes in a Committee in accordance with certain disclosed embodiments of the invention.

FIG. 9 depicts an exemplary exchange of communications among validator nodes that may be used for the exemplary process of reconfiguring the validator-node membership of the Committee 210 in accordance with certain disclosed embodiments. In some embodiments, the Leader node may use a three-phase process to complete the processing (or fulfilling) of a new received transaction request or candidate request. In such embodiments, the three phases are a Prepare phase, Pre-Commit phase, and Commit phase. In some embodiments, at each phase each Associate node may preferably cast vote based on their decision making by generating and transmitting a partial signature to the Leader node. In some other embodiments, each Associate node may cast vote by partial signature and/or other methods.

Before the Prepare phase begins, the candidate Common nodes 230 may transmit their candidate requests through the P2P network 200 to one or more validator nodes as described, for example, at step 750 of FIG. 7. The validator nodes that receive the candidate request may in turn make decisions on whether to add the Common node 230 to their candidate pool(s) and whether to send the received candidate request to the Leader node for potentially adding the Common node to the next Committee.

In the Prepare phase of reconfiguring the membership of the Committee 210, the Leader node 260 coordinates with the Associate nodes 240 to reach a consensus over the membership and/or logical configuration of the next Committee 210. The Leader node 260 conducts the coordination by generating and transmitting PKB-1 to the Associate nodes 240 in the Committee. In some embodiments, the Leader node 260 may also transmit each of the candidate requests it receives from the candidate pools of the Associate nodes 240 to every other Associate node in the Committee. In this manner, the Leader node distributes all of the candidate requests that had been successfully validated by validator nodes in the Committee to each of the Associate nodes.

It is possible that not all of the Associate nodes in the Committee may have received each of the candidate requests distributed by the Leader node because of various predictable or unpredictable failures in the network. It is also possible that some validator nodes may receive incorrect or illegal candidate requests, for example, from a malicious network node or a malfunctioning node. In either situation, a validator node that fails to receive a proper candidate request may not function properly in participating in the selection of the membership and/or logical configuration of a new Committee. The disclosed embodiments prevent catastrophic failures in the selection of a new Committee and allow the validator nodes to reach a consensus about the composition of the new Committee using a multi-round signature protocol that provides fault tolerance even when one or more of the validator nodes has failed or otherwise becomes compromised. Preferably, in some embodiments, for a fault tolerance of f failed validator nodes, the Committee must include at least 3f+1 validator nodes.

At step 910, after the campaign described in FIG. 6 has completed, the Leader node 260 verifies the candidate requests it has received, selects a best candidate Common node, and creates a Preliminary KeyBlock block (PKB). For the purpose of illustration and discussion in the exemplary embodiment of FIG. 9, the newly-created PKB is referred to as "PKB-1." The Leader node 260 then transmits PKB-1 and all the candidate requests it received from all Associate nodes to each Associate node 240 in the Committee 210. As described above, in some embodiments, the Leader node 260 and Associate nodes 240 may be connected in a star configuration, in which case PKB-1 is transmitted directly from the Leader node to each of the Associate nodes. In alternative embodiments, for example, the Leader node 260 and Associate nodes 240 may be connected hierarchically, such as in a tree structure, in which case the PKB-1 is transmitted from the Leader node at the root of the tree structure and relayed by Associate nodes at the various levels of the hierarchical tree structure, until the PKB-1 has been received by each of the Associate nodes.

In some exemplary embodiments, the Leader node 260 may select the best candidate using a verifiable random function (VRF), In other exemplary embodiments, the Leader may select the best candidate using one or more VRFs, one or more nonces (e.g., if the corresponding candidate is added based on POW), one or more weights (e.g., if the corresponding candidate is added based on POS), or any other predetermined criteria, or combinations thereof.

At step 920, each Associate node receives and stores the PKB-1 and candidate requests received from the Leader node 260 in its local memory or in any external memory (local or remote) accessible to that node. The Associate node verifies the candidate requests it receives from the Leader node, for example by verifying the Leader node's digital signature in the received PKB-1, and then chooses its own selection of a best candidate Common node from among all the candidate requests it has received from nodes in the network, including from the Leader node. The Associate node then verifies the accuracy of the received PKB-1 by comparing the best-candidate data in the PKB-1 block with the best candidate Common node that it has selected based on its own determination.

The data in PKB-1 corresponding to the Leader node's selection of a best candidate Common node may include, for example, an IP address, public key, or other identifying information relating to the selected candidate Common node. Based on the verification performed by each Associate node, at step 920 each Associate node may separately generate a Partial Prepare Signature (PPS) and transmit its generated PPS to the Leader node 260, either directly or indirectly depending on the logical configuration of the Committee 210. In some embodiments, each Associate node may only generate or transmit the PPS when the Associate node successfully verifies and approves the data in the PKB-1. The PPS signature may comprise a digital signature of at least some information stored in the PKB-1 block, and may be generated using the Associated node's private key so the Leader node can subsequently verify the PPS signature using the Associate node's corresponding public key.

The Prepare phase in the process of fulfilling a transaction request to add a TB to the TransactionBlock chain 510 is similar to the above-described Prepare phase of fulfilling a candidate request for the process of reconfiguring the membership of the Committee 210, except that the Leader node 260 further coordinates with the Associate nodes 240 to reach a consensus over which transaction request(s) to include in the next TB.

In some embodiments, the Leader node determines whether a new transaction request should be contained in the next TB. Therefore, in such embodiments, every transaction request the Leader node 260 receives from an Associate node may trigger the Leader node to proceed to the Prepare phase. In other embodiments, the Leader node may determine which transaction request or transaction requests should be contained in the next TB. For example, there may be predetermined rules that over a certain time period and/or after receiving a number of transaction requests equal to or above a threshold number, the Leader node 260 may proceed to the Prepare phase. In accordance with certain disclosed embodiments where the validator nodes of the Committee determine whether multiple transaction requests may be contained in the next TB, the PPS may contain the Associate node's votes with respect to each transaction request.

At step 930, at the beginning of the Pre-Commit phase, the Leader node 260 collects all of the PPS signatures it has received from the Associate nodes. In some embodiments, when the Leader node has received more than a predetermined threshold number of PPS signatures, the Leader node 260 aggregates the received partial signatures from the Associate nodes to create an Aggregate Prepare Signature (APS). The Leader node may transmit the APS signature to the Associate nodes in the same manner that it transmitted the PKB-1.

At step 940, each Associate node 240 verifies the Aggregate Prepare Signature, for example, using the validator node's public key. By verifying the received APS signature, the Associate nodes 240 learn whether a sufficient number of Associate nodes have received and verified the PKB-1. If an Associate node 240 successfully verifies the APS signature, it may generate a Partial Pre-Commit Signature (PPCS) and transmit the PPCS signature to the Leader node 260 in the same manner that it generated and transmitted a PPS signature.

The Pre-Commit phase in the process of fulfilling a transaction request is similar to the Pre-Commit phase in the process of reconfiguring the validator-node membership of the Committee 210, except that the Leader node 260 coordinates with the Associate nodes 240 to reach a consensus over which transaction request(s) to include in the next TB.

At step 950, at the beginning of the Commit phase, the Leader node 260 collects the transmitted PPCS signatures from the Associate nodes. When it receives a threshold number of PPCS signatures, the Leader node 260 generates an Aggregate Pre-Commit Signature (APCS), indicating that the Leader node has verified that a sufficient number of Associate nodes 240 has received and verified the APS signature, which indicates a sufficient number of Associate nodes have received and verified the PKB-1. The Leader node may transmit the APCS signature to the Associate nodes in the same manner that it transmitted the PKB-1 and APS signature.

At step 960, each Associate node 240 verifies the APCS received from the Leader node 260, for example, using the Leader node's public key. In this exemplary process, by verifying the received APCS signature of the Leader node, the Associate nodes 240 learn whether a sufficient number of Associate nodes have received and verified the APS. If an Associate node 240 successfully verifies the APCS signature, it may generate a Partial Commit Signature (PCS) and transmit the PCS signature to the Leader node 260 in the same manner that it generated and transmitted the APCS signature.

The Commit phase in the process of fulfilling a transaction request is similar to the Commit phase in the process of reconfiguring the membership of the Committee 210, except that the Leader node 260 coordinates with the Associate nodes 240 to reach a consensus over which transaction request(s) to include in the next TB.

At step 970, at the beginning of the Decide phase (which is the phase when the candidate request or transaction request is fulfilled), the Leader node 260 collects the transmitted PCS signatures from the Associate nodes 240 in the Committee. When it receives a threshold number of PCS signatures, the Leader node 260 generates an Aggregate Commit Signature (ACS), indicating that the Leader node has finalized the PKB-1 for addition as a new block to add to the Keyblock blockchain 510. The Leader node 260 may broadcast the ACS and the finalized PKB-1, which is referred to as "KB-1" in FIG. 9, to each of the Associate nodes and any Common nodes that store copies of the KeyBlock blockchain in the network 200. After receiving KB-1, each Associate or Common node may verify the authentication of the KB-1 by checking the ACS signature and then, if the KB-1 block is verified, store KB-1 in its storage and update its operation in accordance with the information in KB-1. For example, future candidate requests from the Common nodes 230 may be encrypted using a new public epoch key included in KB-1.

At step 980, each validator node may determine anew Leader node and may also transmit a request for view change to the other validator nodes in the Committee. Step 980 will be described in detail with reference to FIG. 12.

The Decide phase in the process when a transaction request is fulfilled is similar to the Decide phase in the process of reconfiguring the membership of the Committee 210, except that the Leader node 260 coordinates with the Associate nodes 240 to reach a consensus over which transaction request(s) to include in the next TB. In some embodiments, the Decide phase for a transaction block may not contain step 980 where a view change may not be present at process of fulfilling every transaction request.

The new Committee 210 may start operating as soon as the KB-1 is formed and is transmitted to at least one of the Associate or Common nodes. In this example, the new Committee includes the newly-selected Common node, which now becomes an Associate node in the Committee. In forming the new Committee, the Leader node also may have removed a previous Associate node to replace it with the newly-selected Common node, for example, based on the age, priority level, or any other criteria associated with the Associated node being removed from the Committee. The new Committee 210 may, in response to future candidate requests, generate the next KeyBlock block, for example KB-2, and establish the next Committee using the same procedure discussed above.

Although the exemplary embodiment above is described in the context of a blockchain implementation, persons skilled in the art will understand that other data-management schemes can also benefit from using the multi-round signature protocol described above in connection with a Committee having a Leader node and one or more Associate nodes. For example, instead of transmitting the PKB-1 to each Associate node, the Leader node 260 instead may transmit a Structured Query Language (SQL) instruction to the Associate nodes at step 910. In such an alternative embodiment, at step 970 the Leader node may transmit at least one finalized SQL instruction associated with its ACS signature for each Associate and/or Common node that receives the finalized SQL instruction to execute.

Figure 10:
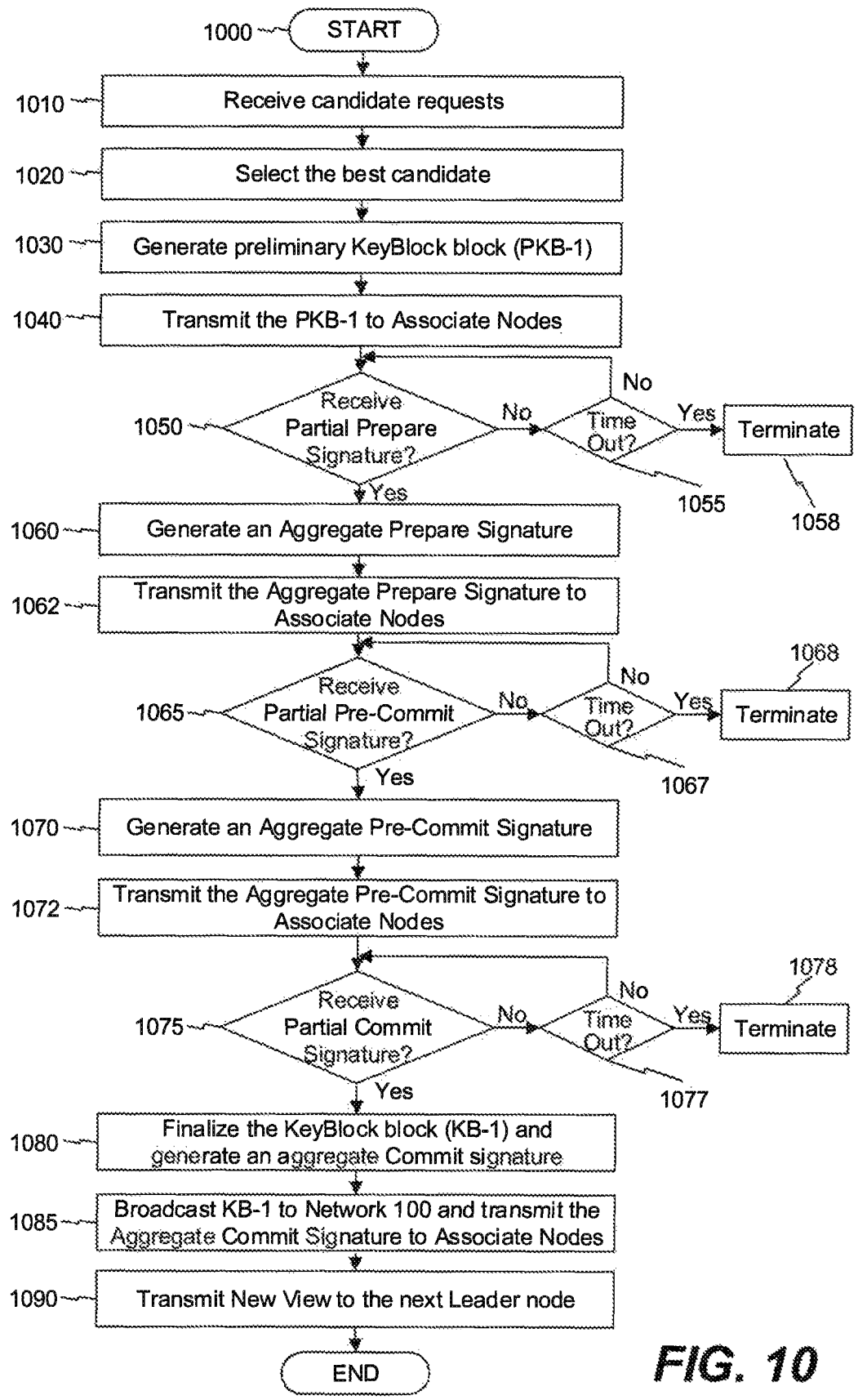
FIG. 10 is a flowchart showing an exemplary sequence of steps that a Leader node may perform as part of a second stage of a process for reconfiguring the membership of nodes in a Committee in accordance with certain disclosed embodiments of the invention.

FIG. 10 is a flowchart showing an exemplary sequence of steps that the Leader node 260 may perform as part of a second stage of a process for reconfiguring the membership of Committee 210 in accordance with certain disclosed embodiments. The sequence starts at step 1000 and proceeds to step 1010 where the Leader node 260 may receive candidate requests from Associate nodes 240 during a campaign. As explained with reference to FIG. 6, the campaign may end based on the expiration of a certain time period, triggering event, or reception of a message indicating an end of the campaign in the P2P network 200. In some embodiments, the campaign may end based on a triggering event due to the number of new TBs added to the Transaction-Block blockchain 510 during the term of the current Committee 210 (i.e., since the previous new block addition to Keyblock chain) has exceeded a threshold number of TBs.

At step 1020, after receiving the candidate requests, the Leader node 260 may verify the candidate requests and select a best candidate Common node to join the next Committee. In some embodiments, the Leader node 260 may discard a candidate request if the request does not correspond to a Common node. The Leader node may verify each candidate request against information included in one or more previously-received candidate request(s). In some other embodiments, whether the Leader node has previously selected the Common node does not affect the Leader node's verification of the Common node's candidate request, e.g., based on POW, POS, and/or POA, as long as the current candidate request provides sufficient information for verification. The Leader node 260 alternatively, or in addition, may utilize other verification methods to ensure the authentication and accuracy of each candidate request that it receives.

It is possible that the Leader node 260 may receive only one candidate request from Associate nodes 240 during the first stage of the reconfiguration process. In this case, the Leader node 260 may determine that the Common node corresponding the only candidate request is the best candidate after verifying that candidate request. In some embodiments, the Leader node 260 may receive multiple candidate requests and may select the best candidate among the multiple candidate requests. In some embodiments, the Leader node 260 may select the best candidate based on the type of the candidate requests. For example, if the candidate requests are based on POW, the Leader node may select the one that is the earliest mined and has a valid nonce value. If the candidate requests are based on POS, for example, the Leader node may select the one that has the highest weight percentage of the stake. In other exemplary embodiments, the Leader node may select the best candidate based on VRF methods. In such embodiments, the Leader node may keep a copy of the private key that can compute the hash of the VRF, and store the corresponding public key in the PKB-1 so that Associated nodes 240 can use the public key in the PKB-1 to verify the Leader node's digitally-signed hash created using the VRF methods. In some embodiments, the Leader node may select the best candidate Common node based a combination of the methods above and/or other techniques known in the art. As noted above, in accordance with the disclosed embodiments, the Leader node and Associate nodes preferably use the same techniques for selecting the best candidate Common node to join the next Committee.

In some embodiments of step 1020, after selecting the best candidate, the Leader node 260 also determines other members of the next Committee. In some embodiments, the next Committee is preferably formed by replacing one or more of the existing the validator nodes in the Committee with the candidate Common node(s) corresponding to the best candidate request(s) identified as part of the reconfiguration process. For example, the Leader node may replace an existing Associate node with the selected best candidate Common node. In some embodiments, the oldest validator node will be removed from the next Committee and be replaced with the selected candidate Common node. In a blockchain implementation, for example, the validator node that consecutively appears in a furthest block of the Key-Block blockchain and/or CommitteeBlock blockchain may be removed and replaced. In other embodiments, the Leader node 260 may generate a queue of validator nodes according their age or other indication of seniority, for example, where the oldest validator node is at the rear of the queue and the youngest validator node is at the front. The age of the validators may be defined by the length of continuous time or terms that the validator node has served on the Committee. In some embodiments, the Leader node 260 may take other factors, such as POS or past performance or priority levels, into consideration when generating the order of validator nodes in a queue of validator nodes to replace. For example, the Leader node may modify the order of the queue by moving a validator node to the rear of the queue if it has not been working properly, e.g., the validator node has not responded in a previous round of voting, or if the validator node has responded in an incorrect way, or if the validator node has acted suspiciously or maliciously in other ways or has failed to act at all.

In accordance with the exemplary embodiments, the validator node at the rear of the queue may be removed from the next Committee and be replaced with the selected best candidate Common node. Those skilled in the art will appreciate that the queue in the exemplary embodiments may be replaced with any other suitable data structure that the Leader node may use to keep track of an order of validator nodes to remove from the Committee, for example, to replace with a selected candidate Common node.

In some embodiments of step 1020, the Leader node 260 may determine the next Leader node to serve on the next Committee according to predetermined rules. The next Committee may be referred to as a "new view." For example, in some embodiments, the Leader node 260 may determine the selected best candidate Common node (i.e., the youngest validator node to participate in the next Committee) will be the next Leader node. In some other exemplary embodiments, where a queue of validator nodes has been created, the Leader node 260 may pick a validator node located at a predetermined position in the queue to be the next Leader node. In yet other embodiments, the Leader node may choose a new Leader node according to a predetermined protocol, such as based on a POW challenge among the Associate nodes in the Committee. In yet other embodiments, the Leader node may select a validator node to serve as the next Leader node according to a predetermined function or equation, such as but not limited to a weighted equation involving POS, POA, age, or other parameters. In some other embodiments, the predetermined rules may not require a change of the Leader node for every request fulfillment. For example, the predetermined rules may require the Leader node 260 to determine a next Leader node every ten transaction blocks added.

In some embodiments, the Leader node 260 may collect the public keys of all the validator nodes of the next Committee after the Leader node has determined which network nodes will be on the next Committee. The public keys may have been previously received and stored in Leader node's local memory, or another local or remote memory accessible to the Leader node, or the Leader node may request the public keys from each network node that will serve as a validator node on the next Committee. The Leader node may further generate a new epoch public/private key pair. The new pair of epoch keys may be used during the term of the next Committee to digitally sign and validate transaction blocks and/or other blockchain blocks. Alternatively, the next Leader node may generate the new pair of epoch public and private keys and transmit, or have transmitted, the new pair of epoch public/private keys to the current Leader node 260. In some embodiments, the new epoch public/private keys are generated by the next Leader node, encrypted using the current epoch public key, and transmitted to the current Leader node, who can validate the encrypted new-epoch keys using the current epoch private key. In some further embodiments, the new epoch public/private keys may also be transmitted to the current Associate nodes, who can also validate the encrypted new-epoch keys using the current epoch private key.

At step 1030, the Leader node 260 generates the PKB-1, which is described above with reference to step 910 in FIG. 9. PKB-1, as well as all PKBs, preferably has a structure described with reference FIG. 5A. The PKB-1 may contain the public key of the new epoch key pair. In some embodiments, it also may include public keys of all of the validator nodes of the next Committee. In some other embodiments, it may include only the public key of the new Committee member and/or the public key of the Committee member that will be removed in the next Committee. In some embodiments, PKB-1 may contain the height (e.g., length) of a current blockchain and/or other system information or other desired information. PKB-1 may further contain a hash value of the highest (most recent) KeyBlock block in the KeyBlock chain, i.e. the parent KeyBlock block, which may be referred to as KB-0. In this case, the KeyBlock blocks may be linked through their hash values and copies of the KeyBlock blockchain stored and distributed among the validator nodes in the Committee.

After the PKB-1 is generated, the Leader node 260 transmits the PKB-1 to each Associate node in the Committee, either sending it directly or indirectly to the Associate node depending on whether the Leader node has a direct connection to that Associate node (step 1040). In some embodiments, for example, the Leader node 260 may be directly connected to each of the Associate nodes 240, for example, forming a star network. In some embodiments, Associate nodes 240 and the Leader 260 may be connected in a tree structure, in which the Leader node serves as a root node, to which one or more of the Associate nodes are connected. Each Associate node connected to the root then serves as the root node for the next level, to which one or more of the other Associate nodes are connected. In these embodiments, the PKB-1 may be first transmitted to the Associate nodes directly connected to the Leader node 260 and then may be further transmitted by these Associate nodes to other levels of Associate nodes.

At step 1050, the Leader node 260 collects Partial Prepare Signatures from the Associate nodes 240. The PPS signatures may be generated by the Associate nodes using the exemplary process described with reference to FIG. 11. The Associate nodes may transmit their PPS signatures to the Leader node 260 directly or route them to the Leader node via the exemplary tree structure described above with reference to FIG. 3B. To generate an aggregate signature in certain embodiments, the Leader node 260 must receive a threshold number of partial signatures from the Associate nodes. The threshold number of PPS signatures that the Leader node is configured to receive may vary depending on the selection of the multi-signature scheme and/or the fault tolerance of the system. In some embodiments, the Leader node is preferably configured such that at least 2f+1 signatures are required to create an aggregate signature in a system tolerating f faults. The Leader node 260 may wait, for example, until expiration of a time-out period that terminates the reconfiguration process or until it has received a predetermined threshold number of PPS signatures, at step 1055. If the time-out period expires, then the process 1000 may terminate at step 1058 or the Associate nodes may send view-change requests and a view-change process may be started.

At step 1060, the Leader node 260 generates an aggregate prepare signature using a multi-signature scheme. In the disclosed embodiments, many algorithms may be used to generate the APS signature, such as using Schnorr multi-signatures or a Boneh-Lynn-Shacham (BLS) signature scheme. The multi-signature scheme may provide that the Leader node waits until it receives a threshold number of signatures from its Associate node co-signers, and when it does, it can generate an APS signature for the entire Committee of validator nodes. In an exemplary embodiment, the threshold number is 2f+1 for a system that can tolerate f faulty validator nodes.

This threshold may vary depending on the setup of the system. In some embodiments, the aggregate signature generated by the Leader node at step 1060 may be subsequently verified using an epoch public key for the validator-node Committee or by a set of public keys corresponding to individual validator nodes in the Committee.

At step 1062, the Leader node 260 transmits the generated APS signature to the Associate nodes 240 in the same manner as it transmitted the PKB-1 block at step 1040, and, at step 1065, the Leader node collects Partial Pre-Commit Signatures (PPCS) from the Associate nodes in the same manner as it collected the PPS signatures in step 1050. The PPCS signatures may be generated by the Associate nodes using the exemplary process described with reference to FIG. 11. The Associate nodes may transmit their PPCS signatures to the Leader node 260 directly or route them to the Leader node via the exemplary tree structure described above with reference to FIG. 3B. The Leader node 260 may wait, for example, (1) until expiration of a time-out period that terminates the reconfiguration process or that starts a view-change process; or (2) until it has received a predetermined threshold number of PPCS signatures, at step 1067. If the time-out period expires, then the process 1000 may terminate at step 1068 or a view change process may be started. In some embodiments, the Leader node 260 may transmit the private epoch key by storing it in the PKB-1 that is transmitted to Associate nodes. In some other embodiments, the Leader node 260 may transmit the public epoch key to the Associate nodes at another time in the process 1000, for example, to an Associate node in response to receiving a PPCS signature from that Associate node.

At step 1070, when the Leader node 260 receives at least a predetermined threshold number of PPCS signatures from the Associate nodes, the Leader node 260 generates an Aggregate Pre-Commit Signature (APCS) in the same manner as it generated the APS signature in step 1060. The APCS indicates that the Leader node has verified that a sufficient number of Associate nodes 240 has received and verified the APS signature, which indicates a sufficient number of Associate nodes have received and verified the PKB-1. At step 1072, the Leader node may transmit the APCS signature to the Associate nodes in the same manner that it transmitted the PKB-1 and APS signature in the earlier steps 1040 and 1062.

At step 1075, the Leader node collects Partial Commit signatures (PCS) from the Associate nodes in the same manner as it collected the PPS signatures in step 1050 and PPCS in step 1065. The PCS signatures may be generated by the Associate nodes using the exemplary process described with reference to FIG. 11. The Associate nodes may transmit their PPCS signatures to the Leader node 260 directly or route them to the Leader node via the exemplary tree structure described above with reference to FIG. 3B. The Leader node 260 may wait, for example, (1) until expiration of a time-out period that terminates the reconfiguration process or that starts a view-change process; or (2) until it has received a predetermined threshold number of PPCS signatures, at step 1077. If the time-out period expires, then the process 1000 may terminate at step 1078. In some embodiments, the Leader node 260 may transmit a private epoch key to an Associate node in response to receiving a PPCS signature from that Associate node. In alternative embodiments, the Leader node 260 may transmit the private epoch key to the Associate nodes at another time in the process 1000.

At step 1080, when the Leader node 260 receives at least a predetermined threshold number of PCS signatures from the Associate nodes, the Leader node 260 generates an Aggregate Commit signature (ACS) in the same manner as it generated the APS signature in step 1060 and APCS in step 1070. The Leader node finalizes the PKB-1 block by incorporating the generated ACS signature into the PKB-1 block, thereby creating a finalized KeyBlock block (KB-1). At step 1085, the Leader node 260 transmits the KB-1 block to each of the Associate nodes and, optionally, transmits KB-1 to at least one of Common nodes. In the event that a Common node becomes a member of the next Committee, the Leader node 260 may also transmit the ACS and the KB-1 block to the Common node. The Leader node may broadcast the KB-1 block or otherwise transmit it so the new KeyBlock KB-1 is received by each of the Associate nodes and any Common node(s) storing a copy of the KeyBlock blockchain. After receiving the new KB-1 block, the Associate nodes and Common nodes may further transmit the new received KB-1 block to other network nodes in the network 200 to ensure it is added to every copy of the KeyBlock blockchain in the P2P network 200.

In some embodiments, if the request is a transaction request and a new TB is broadcast by the Leader node, the client nodes and common nodes in the network may not need to store the new TB. In some other embodiments, the client nodes and common nodes may store the new TB in the same way as they store KB-1 when the request is a candidate request.

A client node or a common node may not need to verify every new transaction block. In some embodiments, when a client node or a common node intends to verify a transaction block, it may access the transaction block and get information about the corresponding KeyBlock, and then access the corresponding KeyBlock to retrieve public epoch key or public keys, then it just need to verify the Aggregate Commit Signature (ACS) in the corresponding TransactionBlock (TB-1) using the public epoch key or public keys. This is because the new transaction block's corresponding KeyBlock has the same committee as the new transaction block. Once the ACS in the TransactionBlock is successfully verified, the client node or the common node has successfully verified the transaction block. Similarly, if a client node or a common node intends to verify a KeyBlock, it may access the KeyBlock to retrieve public epoch key or public keys and verify the ACS in the KeyBlock using the public epoch key or public keys.

This provides a couple advantages over the art. For example, in traditional blockchain protocols such as Bitcoin and Ethereum, to be secure against malicious behaviors such as double spending, when receiving a new block NB-1 in the network, each node needs to wait multiple blocks before it can confirm that the new block NB-1 is acceptable. And this means each node need to store information of at least the multiple blocks for verification and conduct necessary computation based on the information of at least the multiple blocks. In some other traditional protocols, the node need to store information in all the past blocks in the blockchain, which incurs even more burden on storage and computation power. These issues are avoided by the present disclosures.

At step 1090, the Leader node 260 may transmit the new view to the next Leader node. As described in detail with reference to step 1020, the Leader node 260 may determine the next Leader node according to predetermined rules in step 1020. In some embodiments, the information of the next view may be stored in KB-1 and such that step 1090 may be skipped. In some embodiments, the predetermined rules may not require a change of the Leader node for every request fulfillment and such that step 1090 may be skipped.

Figure 11:
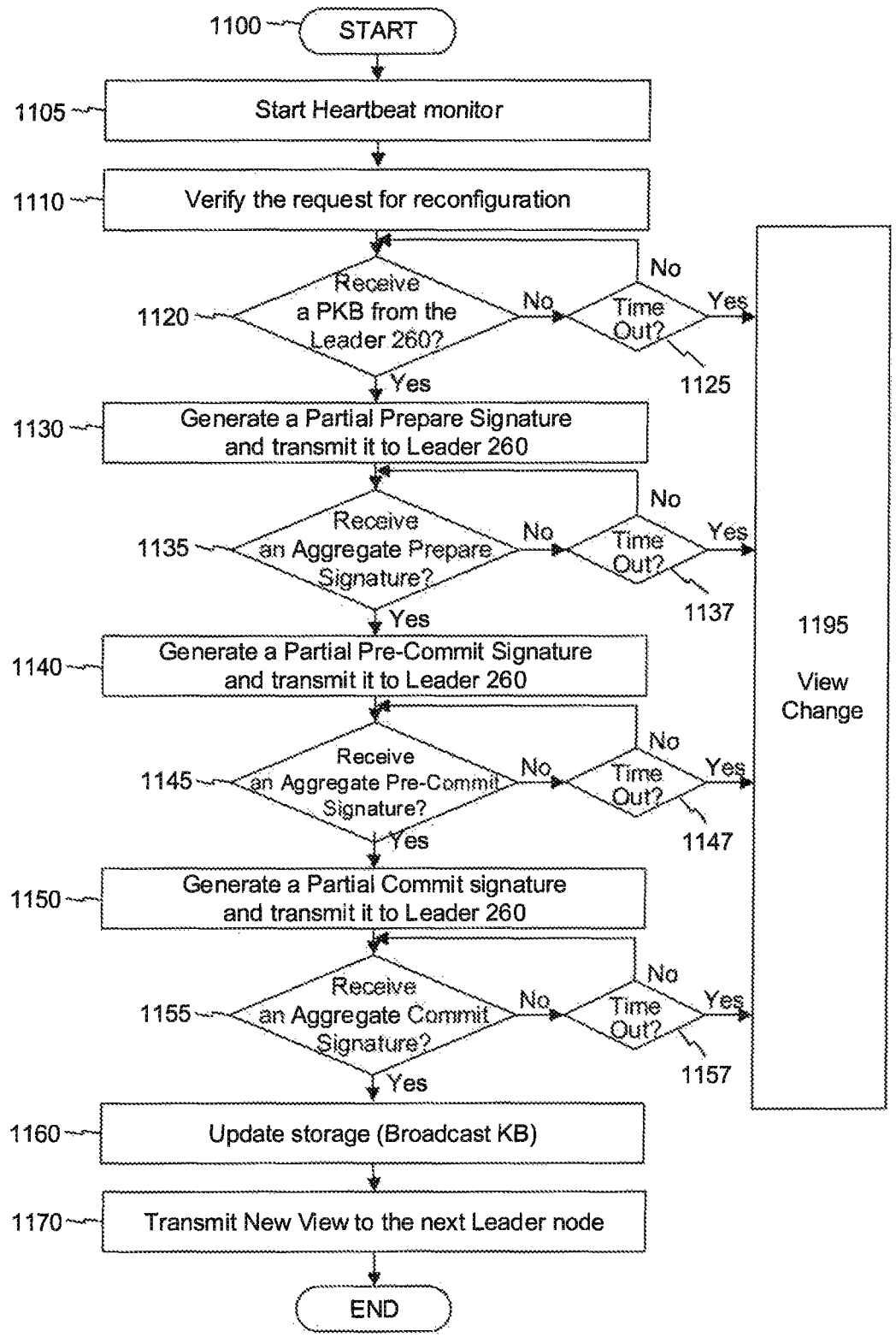
FIG. 11 depicts a flowchart showing an exemplary sequence of steps that an Associate node may perform as part of a second stage of a process for reconfiguring the membership of nodes in a Committee in accordance with certain disclosed embodiments of the invention.

FIG. 11 depicts a flowchart showing an exemplary sequence of steps that an Associate node 240 may perform as part of a second stage of a process for reconfiguring the membership of the Committee 210 in accordance with certain disclosed embodiments. The sequence starts with step 1100, where the campaign begins, such that Associate nodes 240 may receive candidate requests from Common nodes and may transfer some of the received candidate requests to the Leader node 260 after validation. Leader node 260 may receive candidate request a from Associate nodes 240 or Common nodes 230 during the campaign. As explained with reference to FIG. 6, the campaign may end based on the expiration of a certain time period, triggering event, or reception of a message indicating an end of the campaign in the P2P network 200.

At step 1105, the Associate node may start a Heartbeat monitor. In some embodiments, the Heartbeat monitor may be used by each Associate node to monitor the "liveness" (e.g., as determined based on responsiveness or operation) of the Leader node 260 and/or other validator nodes in the Committee 210. The Heartbeat monitor is preferably independent from the Leader node 260. The Heartbeat monitor may start before the start of the reconfiguration, and is preferably started at or right after the beginning of the campaign, such that a view-change process can be started, for example, as early as when the Leader node fails to generate and transmit PKB-1 to the Associate nodes 240. In some embodiments, the liveness of the Leader node may relate to whether the Leader node has timely generated a new KB, TB, or performed other tasks that need to be performed by the Leader node, or the like, or any combination thereof.

In some embodiments, the Heartbeat monitor may monitor whether the Leader node has timely generated a new KB based on the expiration of a certain time period, triggering event, or reception of a message, or a combination thereof.

In some embodiments, the Heartbeat monitor may relate its decision regarding the liveness of the Leader node based on a triggering event of the end of a campaign. For example, if the campaign may end based on the triggering event that the number of new TBs added to the TransactionBlock blockchain 510 during the term of the current Committee 210 has exceeded a predetermine threshold number, the Heartbeat monitor may determine the liveness of the Leader node based on whether a new KB was added to the KeyBlock blockchain a certain time period after the triggering event. In other exemplary embodiments, the Heartbeat monitor may determine liveness of the Leader node based on a combination of factors. For example, the Heartbeat monitor may generally determine the liveness of the Leader node by verifying whether a new KB is added after the number of new TBs exceeds a predetermined threshold (such as 100), but if the network 200 is busy, the Heartbeat monitor may increase the predetermined threshold number of TBs (such as 150). In some embodiments, in the event that the Heartbeat monitor determines that the liveness of the Leader node does not meet its requirement, the Associate node may generate a new view-change message and send it to the other validator nodes in the Committee to start the process of selecting a new Leader node.

In some embodiments, the Associate node performing the process 1100 may receive a request to start a reconfiguration process from another validator node in the Committee, for example, in response to a new campaign or based on the Heartbeat monitor indicating that the Leader node is not sufficiently "live" and should be replaced. The Associate may verify a digital signature in the received request for reconfiguration at step 1110, for example, using a public key of the validator node in the Committee that sent the request to start the reconfiguration process.

At step 1120, the Associate node 240 may receive a preliminary KeyBlock PKB-1. In some embodiments, the Associate node 240 may also receive candidate requests from the Leader node 260 to reduce the possibilities of failure to reach consensus owing to Associate nodes' failure of receiving candidate requests. Further to the disclosed embodiments, the Associate node may verify whether the received PKB-1 was generated by the Leader node 260 by verifying a digital signature in the PKB-1, for example, using the Leader node 260 node's public key.

Further to the disclosed embodiments, the Associate node 240 also may verify whether the PKB-1 was generated in accordance with the candidate requests. In some embodiments, the Associate node may independently select the best candidate based on all of the candidate requests corresponding to its candidate pool and/or it receives from the other nodes, and compare its determined best-candidate Common node with the best-candidate Common node that was selected by the Leader node in the received PKB-1. In other embodiments where the Leader node uses VRF to select a best candidate, the Associate node may use the public key in the PKB-1 to verify the digitally-signed VRF hash and the Leader node's best-candidate selection. In yet other exemplary embodiments, the Associate node 240 may generate its own preliminary KeyBlock block and compare its generated KeyBlock block with the received PKB-1. In some embodiments, if the Associate node does not receive any PKB-1 from the Leader node 260 before expiration of a timeout period at step 1125, the Associate node may initiate a view-change procedure to select a new Leader node at step 1195. The view-change procedure may comprise the Associate node transmitting a request for a view change to the other Associate nodes in the Committee. In some other embodiments, if the PKB-1 fails to pass the Associate node's verification(s), the Associate node also may initiate a view-change procedure. Otherwise, the Associate node 240 proceeds to step 1130.

In some embodiments, the Associate nodes preferably may independently select the best candidate based on the same predetermined rules that the Leader node uses to select its choice of the best candidate Common node. For example, the Associate nodes and the Leader node may select the earliest candidate request that it received to be its selection of the best candidate Common node. In some other embodiments, the Associate nodes may independently select the best candidate based on certain rules that are different from the rules that the Leader node uses to select its choice of the best candidate Common node.

In some embodiments, as described in detail with reference to step 1020, the Leader node 260 may select the next Leader node according to predetermined rules. At step 1020, the Associate node may verify the selection of the next Leader node received from the Leader node. The Associate node may conduct the verification based on the same predetermined rules as the Leader node 260 to select the next Leader node. In some embodiments, the Associate node conducting verification may send their approval to the node that it selected. If an Associate node has received a threshold number of approval, it may proceed to 1130. The threshold number is preferably configured to be 2f+1.

At step 1130, the Associate node generates a Partial Prepared Signature using its private key. In some embodiments, the PPS signature may be generated using a multi-signature scheme. The Associate node 240 then transmits the generated PPS signature to the Leader node 260. In some embodiments, the Associate node may transmit the generated PPS signature directly to the Leader node 260 or indirectly to the Leader node, for example, when the validator nodes are organized in a tree structure as illustrated in FIG. 3B. In an exemplary embodiment, the Associate node may first transmit the PPS signature to its parent node, which in turn relays this partial signature to the next level until the signature reaches the Leader node 260. For example, with reference to FIG. 3A, the Associate node 240a1 generates a PPS signature and transmits the partial signature to the Associate node 240b1. The Associate node 240b1 may generate its own PPS signature, which it may transmit separately or together with the PPS signature that it received from Associate node 240a1, to the Leader node 260.

In another embodiment, multiple Associate nodes may transmit PPS signatures to the same parent Associate node in the hierarchical arrangement of the Committee's validator nodes. The parent Associate node may generate an Aggregated Partial Signature using the PPS partial signatures that it has received from its child nodes and transmit the APS to its parent Associate node at the next level of the hierarchical arrangement. The APS may be a concatenation of multiple PPS signatures (signed or unsigned) or may be otherwise derived from the multiple PPS partial signatures. For example, the Associate node 240a1 may generate a partial signature and transmit the PPS signature to Associate node 240b1. Associate node 240b1 generates an Aggregate Partial Signature using PPS signatures it has received from Associate nodes 240a1 and 240a2 and, optionally, a partial signature generated by itself. The Associate node 240b1 then transmits the generated aggregated partial signature to the next level, for example the Leader node 260, which further aggregates received PPS partial signatures from the Associate nodes.

At step 1135, the Associate node 240 receives an Aggregate Prepare Signature from the Leader node 260. After the APS signature is received, the Associate node verifies the authentication of this APS signature. Depending on the multi-signature scheme used by the validator nodes in the Committee for this stage of the reconfiguration process, the Associate node may verify the APS signature using one or more public keys it has previously received. In some embodiments, if the Associate node does not receive any APS signature before the expiration of a time-out period at step 1137, the Associate node may initiate a view-change process at step 1195. In some other embodiments, if the received APS signature fails the Associate node's verification, the Associate node also may initiate a view change procedure.

After the Associate node has verified the Leader node's APS signature at step 1135, the Associate node 240 can be confident that a sufficient number of Associate nodes in the Committee have received and verified the PKB-1 block. Then, at step 1140, the Associate node 240 generates a Partial Pre-Commit Signature (PPCS) in the same manner as it generated a PPS in step 1130, and then it transmits the PPCS signature in the same manner as it transmitted the PPS signature in step 1130. In some embodiments, the Associate node 240 may generate a PPCS signature using a different algorithm than it uses to generate a PPS signature.

In step 1145, the Associate node 240 receives an Aggregate Pre-Commit Signature from the Leader node 260. After the APCS signature is received, the Associate node verifies the authentication of this APCS signature. Depending on the multi-signature scheme used by the validator nodes in the Committee for this stage of the reconfiguration process, the Associate node may verify the signature using one or more public keys it has previously received. In some embodiments, if the Associate node does not receive any APCS signature before the expiration of a time-out period at step 1147, the Associate node may initiate a view-change process at step 1195. In some other embodiments, if the received APCS signature fails the Associate node's verification, the Associate node also may initiate a view change procedure.

After the Associate node has verified the Leader node's APCS signature at step 1145, the Associate node 240 can be confident that a sufficient number of Associate nodes in the Committee have received and verified the APS signature, which indicates a sufficient number of Associate nodes have received and verified the PKB-1.

Then, at step 1150, the Associate node 240 generates a Partial Commit Signature (PCS) in the same manner as it generated a partial prepare signature in step 1130 and a PPCS in step 1140, and then it transmits the PCS signature in the same manner as it transmitted the PPS signature in step 1130 and the PPCS in step 1140. In some embodiments, the Associate node 240 may generate a PCS signature using a different algorithm than it uses to generate a PPS or PPCS.

In step 1155, the Associate node receives an Aggregate Commit Signature from the Leader node 260. In some embodiments, the Leader node may transmit the finalized the KB-1 with the ACS signature. Further, in some embodiments, the Leader node may only transfer the ACS signature, and each Associate node adds the received ACS signature to the PKB-1 block that it previously received at step 1120, thereby creating the same KB-1 block at each of the Associate nodes. The ACS signature may be verified in the same manner as described in step 1150. In some embodiments, if the Associate node does not receive any Aggregate Commit Signature before the expiration of a time-out period at step 1157, the Associate node may initiate a view-change process at step 1195. In some other embodiments, if the received ACS signature fails the Associate node's verification, the Associate node also may initiate a view change process at step 1195.

After the Associate node has verified the ACS signature, the Associate node may be confident that a sufficient number of Associate nodes have confirmed that they have learned that a sufficient number of Associate nodes received the proper PBK-1 block. At step 1160, the Associate node may add the new Keyblock block KB-1 to its copy of the KeyBlock blockchain and also may update its database in accordance with at least some information contained in the received PBK-1. In some embodiments, the Associate node may further transmit the KB-1 to at least one Common node or other Associate node in the network 200. In some embodiments, as described in detail with reference to FIG. 5C, when KB-1 is added to the KeyBlock chain, a new CB 531 is also added to the CommitteeBlock chain 530. In some embodiments, the message data stored in the KB-1 includes a hash of its corresponding new CB 531. In some embodiments, each validator node may generate CB 531 when verifying the new PKB-1, and may add its generated CB 531 to its copy of CommitteeBlock chain 530 when adding KB-1 to its copy of the KeyBlock blockchain. In some other embodiments, the Leader node may transmit the KB-1 with its corresponding CB 531 to the Associate nodes, such that each Associate node may add the CB 531 received from the Leader node to its copy of CommitteeBlock chain 530. Although the KeyBlock data structure described in the context of FIGS. 10 and 11 is in the form of a blockchain, those skilled in the art will understand that the disclosed embodiments may be implemented when adding new information to other types of data structures that could also be benefit from the reconfiguration processes described above.

At step 1170, the Associate node may transmit the new view to the next Leader node. As described in detail with reference to steps 1020 and 1120, the Leader node 260 may determine the next Leader node according to predetermined rules at step 1020 and the Associate node may verify the Leader node's selection at step 1120. In some embodiments, the predetermined rules may not require a change of the Leader node for every request fulfillment and such that step 1170 may be skipped.

Figure 12:
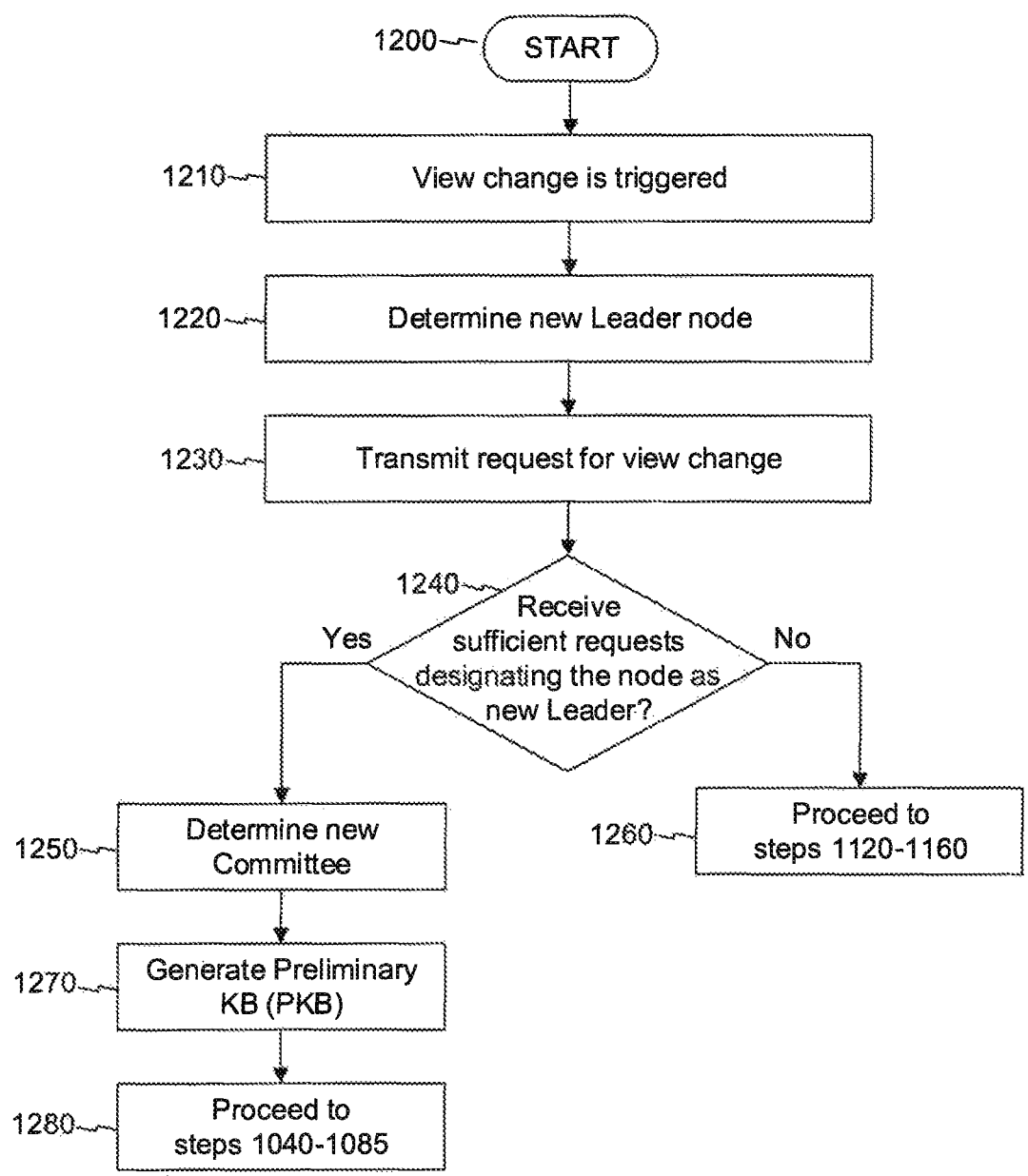
FIG. 12 depicts a flowchart showing an exemplary sequence of steps that an Associate node may perform as part of an exemplary view-change process to select a new Leader node in accordance with certain disclosed embodiments of the invention.

FIG. 12 depicts a flowchart showing an exemplary sequence of steps that an Associate node 240 may perform as part of a view-change process to select a new Leader node in accordance with certain disclosed embodiments of the invention. The view-change process may be used to change the Leader node 260 in cases where the Leader node is deemed inappropriate or unable to continue serving as the Leader node. For example, the Leader node may have stopped responding because of a denial of service (DoS) or distributed DoS (DDoS) attack. In other embodiments, one or more of the Associate nodes may detect that the Leader node 260 has been compromised, for example, by software and/or people within or outside of the entity, such as an enterprise or government, that manages the network 200. An Associate node also may determine that the Leader node is malfunctioning in various scenarios, including the scenarios described with reference to FIG. 11. For example, the Associate node may detect that the Leader node has not sent any new KeyBlock and/or TransactionBlock blocks for a predetermined amount of time, which may be a configured time limit set by a system administrator or otherwise agreed upon by the Associate nodes. The Associate node also may detect that the Leader node may have sent out one or more erroneous preliminary blocks, such as blocks including a wrong signature or one or more blocks with incorrect information.

In some embodiments, multiple Associate nodes that detect a malfunctioning of the Leader node 260 may initiate a view-change process at or around a same time. Further, in some embodiments, each Associate node 240 may select a new Leader node according to a set of predetermined rules. For example, a new Leader node preferably may be selected based on a consensus by a majority of the Associate nodes in the Committee. When a consensus is reached to identify the new Leader node, although it has not yet been formally recorded as the Leader node in a new KeyBlock block of the KeyBlock blockchain, the new Leader node may act as a Leader node and generate the new preliminary KeyBlock block PKB-1, which will identify the new Leader node for the next Committee 210. Thereafter, the new Leader node may coordinate with the Associate nodes to reach a consensus decision to finalize and adopt the new KB-1 block recording the composition of the new Committee including the new Leader node.

The sequence starts at step 1200 and proceeds to step 1210, where a view-change process is triggered. A view change may be triggered when an Associate node 240 determines the Leader node is malfunctioning, compromised, or otherwise untrusted or unavailable. The view change also may be triggered when the Associate node receives requests for a view change from a threshold number of Associate nodes. In some embodiments, for example, a predetermined threshold number of Associate nodes required to trigger a view change is f+1 for a system having fault tolerance of f validator nodes.

At step 1220, an Associate node 240 determines, for example according to one or more rules, or otherwise selects a new Leader node. As described with reference to step 1020 of FIG. 10, there may be various strategies to select a new Leader node. In some embodiments, the Associate node selects a new Leader node using the same strategy that the Leader node 260 selects the best candidate in step 1020. For example, the Associate node 240 may use a VRF to select the new Leader node and send the public key used for signing a VRF hash to the other Associate nodes for verification. In some embodiments, the Associate node may select a new Leader node using a different strategy than the Leader node 260 uses. By way of example and not limitation, the current Leader node in an exemplary embodiment may be configured to select the youngest validator node in the Committee to be the new Leader node, while the Associate node may be configured to select the oldest validator node in the Committee to be the new Leader node.

At step 1230, the Associate node 240 transmits a request for view change to the other validator nodes in the Committee. The request for view change may include information about the new Leader node, such as but not limited to its IP address, public key, or other identifying information. The request for view change may be encrypted or signed by the Associate node using a known algorithm, using either its own private key or the Committee's epoch private key. In some embodiments, an Associate node may perform this step before performing step 1220 and, thus, the request for view change may not include information about the new Leader node. If a request for view change is transmitted before the Associate node determines the new Leader node, the Associate node may send an updated request, or any other notice or message indicating the Associate node's selection for a new Leader node, after it has determined the new Leader node. In such embodiments, the Associate node may transmit its updated request for view change (or other notification or message) identifying its selection for a new Leader node to its selected new Leader node and, optionally, also to the other Associate nodes. Even if an Associate node determines that it should be the new Leader node, the Associate node still may transmit the request for view change to the other validator nodes in the Committee.

In some embodiments, the Associate node 240 may transmit its request for a view change to the other validator nodes directly, regardless of the network structure of the Committee 210. In some embodiments, for example where a tree structure is adopted for the logical arrangement of validator nodes in the Committee, the Associate node may only transmit the request to its child, parent, and/or sibling nodes, if such nodes exist. In these exemplary embodiments, an Associate node receiving such a request for view change may further transmit the request to its own child, parent, and/or sibling nodes to propagate the request throughout the hierarchical tree structure.

At step 1240, the Associate node 240 receives and verifies requests for view change that it receives from the other validator nodes. It examines each received request to determine whether it has been selected as the new Leader node in the request. In some embodiments, if the Associate node determines that it has received a predetermined threshold number of requests for a view change that designates itself as the new Leader node, then the Associate node assumes it has become the new Leader node in the Committee. The predetermined threshold number for this determination is preferably greater than or equal to 2f+1 requests identifying the Associate node as the new Leader node, where f is an intended fault tolerance of the system. At step 1260, if the Associate node determines that it has not received the predetermined threshold number of requests and a predefined time-out period is expired, it may continue serve as an Associate node in the Committee or start another round of view-change, choosing a second best leader based on the rules described at step 1220, if it determines a new Leader node has not been properly selected by the network.

At step 1250, the Associate node 240 assumes that it is the new Leader node and determines the validator-node membership of the new Committee 210. In some embodiments, the membership of the Committee does not change except that the Associate node becomes the new Leader node and the existing Leader node becomes an Associate node. In other embodiments, the existing Leader node may be removed from the Committee 210. If the existing Leader node is removed, a new campaign may be triggered to identify a Common node to add to the new Committee as a replacement for the removed Leader node. In alternative embodiments, a new campaign is not triggered when a new Leader node is selected and the old Leader node is removed, in which case the new Committee may contain one less validator node. In such alternative embodiments, one less validator node may be removed in the next reconfiguration process.

At step 1270, the assumed new Leader node generates a Preliminary KeyBlock block PKB-1 reflecting the determined membership of the new Committee as described in steps 1020 of FIG. 10. In step 1280, the assumed new Leader node coordinates with the other Associate nodes to perform the process of the second stage of reconfiguration to finalize the new Committee in the same manner as described with reference to FIGS. 9-11.

At step 1280, where the Associate node determines it is not selected as the new Leader node, the Associate node may act as an ordinary Associate node and coordinate with the new Leader node to perform the process of the second stage of reconfiguration to finalize the new Committee in the same manner as described with reference to FIGS. 9-11.

After a new KeyBlock block is signed by the new Committee, including the new Leader node, with an Aggregate Commit Signature, the new KB block is broadcasted or otherwise transmitted to network nodes in the network 200 and the view-change process is completed.

Although the steps described with reference to FIG. 12 are sequenced, these steps are not necessarily performed in the order of the exemplary sequence. In some embodiments, for example, some of the Associate nodes in the Committee may perform certain steps in FIG. 12 first while other Associate nodes may perform these steps later.

FIG. 13 depicts an exemplary pipeline process for a request-fulfillment process that may be performed in accordance with certain disclosed embodiments of the invention. As used herein, the request-fulfillment processes may be used for processing transaction requests and/or candidate requests in accordance with the disclosed embodiments. The exemplary pipeline process in FIG. 13 may be performed using the multiple processing phases that were described above with reference to FIG. 9. As explained above, FIG. 9 depicts an exemplary sequence of communications among validator nodes that may be used for fulfilling candidate requests or transaction requests in accordance with certain disclosed embodiments. The exemplary process in FIG. 9 comprises at least three phases (Prepare, Pre-Commit, Commit) for fulfilling requests and further includes a Decide phase where the request-fulfillment process may be completed.

The pipelined process of the Prepare, Pre-Commit, Commit, and Decide phases, as shown in FIG. 13, may allow multiple communications and fulfillment processes to proceed concurrently without interfering with each other. In some embodiments, for example, this exemplary pipelined process may allow multiple concurrent request-fulfillment processes to be performed simultaneously, or at least substantially in parallel, in a pipelined fashion with each concurrent process having a different respective temporal phase relative to the other processes. In the example of FIG. 13, there are four validator nodes that operate in parallel, in a pipelined configuration, to perform respective request-fulfillment processes. Those skilled in the art will appreciate that other embodiments (not shown in FIG. 13) may employ a different number of pipelined request-fulfillment processes and would be consistent with the disclosed embodiments.

In some embodiments, a validator node may not be the Leader node for more than one of the pipelined request-fulfillment processes. Further to some of these embodiments, there may be a view-change process to select a new Leader node at a certain predetermined phase of each request-fulfillment process. In other embodiments, for example, a validator node may be the Leader node of one or more of the concurrent request-fulfillment processes. In accordance with certain disclosed embodiments at steps 1020, the predetermined rules may not require a change of the Leader node for every request-fulfillment process. In such embodiments, there may or may not also be a view-change process at a certain phase of the request-fulfillment process.

The Associate nodes' functions in each request-fulfillment process in the embodiment of FIG. 13 are not changed relative to their description in reference to FIGS. 9 and 11 above, except that in the pipelined process the Associate nodes may use aggregated signatures (and in some embodiments, also signatures in the PKB-1, candidate requests, and/or KB-1) based on a Generic Aggregate Signature (GAS) technique rather than using a specific aggregate signature (such as APS, APCS, ACS). The Leader nodes' role in each request-fulfillment process in the exemplary pipelined embodiment also is not changed from FIG. 9 and FIG. 10 above, except with respect to aggregate signatures as explained below. For example, at a Decide phase of each request-fulfillment process, the Leader node may proceed as described in detail with reference to steps 1075, 1080, 1085 and 1090, except that the Leader node may not be generating and transmitting a specific ACS of its own request-fulfillment process.

Compared to a validator node in a single request-fulfillment process as depicted in the exemplary embodiments of FIGS. 9, 10, and 11, a validator node in the exemplary pipelined process in FIG. 13 may not be an Associate node only or a Leader node only at any given moment. Instead, it is possible that a validator node may be simultaneously an Associate node for some of the concurrent request-fulfillment processes and a Leader node for some of the other pipelined request-fulfillment process(es). For example, as depicted in the generic phase 4 of FIG. 13, node 1 may be the Leader node for process 1 while, at the same time, node 1 is also an Associate node for processes 2, 3, and 4.

In accordance with certain disclosed embodiments, the pipelined process may comprise multiple request-fulfillment processes as depicted in FIG. 9, each having a different Leader node. In the disclosed embodiment in FIG. 13, for example, there are four concurrent request-fulfillment processes that are separately executed by nodes 1-4, such that each of these parallel processes may have a different Leader node. At each moment, there will be four nodes running as the Leader node of their own request-fulfillment process.

In FIG. 13, for example, nodes 1, 2, 3, and 4 are validator nodes at least during generic phase 1 through generic phase 5, and they are each the Leader node of a request-fulfillment process starting at a different generic phase. At generic phase 4, for example, node 1 is the Leader node of process 1 that is at the Decide phase; node 2 is the Leader node of process 2 that is at Commit phase; node 3 is the Leader node of process 3 that is at Pre-Commit phase; node 4 is the Leader node of process 4 that is at Prepare phase. In this example, at generic phases 1, 2, 3, and 5, there are also four request-fulfillment processes but some of the Leader nodes may be validator nodes other than the nodes 1, 2, 3, and 4. For example, at generic phase 1 of FIG. 13, the Leader node of process 1 that is at Prepare phase is node 1; the Leader node of a process that is at the Decide phase in generic phase 1 (not shown in FIG. 13) may be a validator node other than nodes 1, 2, 3, or 4; the Leader node of a process that is at Commit phase in generic phase 1 (also not shown) may be another validator node other than nodes 1, 2, 3, or 4; the Leader node of a process that is at Pro-Commit phase during generic phase 1 (also not shown) may be yet a different validator node other than nodes 1, 2, 3, or 4.

In accordance with certain disclosed embodiments, at each generic phase of the pipelined process, a generic GAS signature may be generated. For example, at generic phase 1 of the exemplary pipelined process in FIG. 13 a GAS-1 signature may be generated; at generic phase 2 of the pipeline a GAS-2 may be generated; at generic phase 3 of the pipeline a GAS-3 may be generated; at generic phase 4 of the pipeline a GAS-4 may be generated. In some embodiments, the GAS signature may comprise an APS, an APCS, and an ACS aggregated signature from three ongoing processes. In other embodiments, the GAS signature may comprise an APS, an APCS, an ACS, a PKB-1, a KB-1, or any combination thereof, from one or more of the pipelined request-fulfillment processes.

In accordance with certain disclosed embodiments, at each generic phase the Leader node of the request-fulfillment process that is at a Prepare phase ("the Leader node in charge") may be the Leader node to generate the GAS signature at this generic phase. For example, at generic phase 4 of FIG. 13, process 4 is at its Prepare phase. Therefore, node 4 may generate GAS-4 which comprises ACS of process 1, APCS of process 2, APS of process 3, and PKB-1 of process 4. Nodes 1, 2, and 3 may not participate in generating GAS-4. Process 1 is at the Decide phase and node 1 is the Leader node of process 1. Node 1 may proceed with steps 1075, 1080, 1085, and 1090 except generating and transmitting a specific ACS of process 1, such that node 1 may generate KB-1 for process 1 upon receiving GAS-4 from node 4. In some embodiments, the GAS generated by the Leader node may be a single value from which each node in each process may interpret the meaning with respect to their process. For example, the GAS-4 may be a single value. Upon receiving GAS-4 as the single value, the validator nodes of process 1 may interpret the value as that there are sufficient number of PCS received for process 1; the validator nodes of process 2 may interpret the value as that there are sufficient number of PPCS received for process 2; the validator nodes of process 3 may interpret the value as that there are sufficient number of PPS received for process 3, etc.

In some preferred embodiments, node 4 may receive partial signatures from other Associate nodes of process 4; node 4 may also receive PCS from other Associate nodes of process 1; node 4 may also receive PPCS from other Associate nodes of process 2; node 4 may also receive PPS from other Associate nodes of process 3. Node 4 may then aggregate all partial signatures node 4 has received, and generate a GAS-4 signature. Node 4 may also generate a PKB-1 at its Prepare phase. In some other embodiments, the Leader nodes of the multiple concurrent request-fulfillment processes may first each collect partial signatures of their own processes, then send their received partial signatures to the Leader node in charge, then the Leader node in charge aggregates the received partial signatures of all the concurrent processes into a single GAS signature for this generic phase. For example, at generic phase 4 of FIG. 13, node 1 may send its received PCS to node 4; node 2 may send its received PPCS to node 4; node 3 may send its received PPS to node 4. Node 4 may generate a PKB-1 for process 4, then aggregate the PKB-1 and its received PCS, PPCS, PPS partial signatures to generate GAS-4. In some other embodiments, the Leader node in charge may directly collect partial signatures from all concurrent request-fulfillment processes and then generate the GAS signature based on the collected partial signatures. For example, at generic phase 4 of FIG. 13, process 4 is the Leader node in charge. Node 4 may directly receive partial signatures from Associate nodes of processes 1, 2, and 3, and use them to generate GAS-4. In yet other exemplary embodiments, node 1 may first generate an ACS at its Decide phase, node 2 may first generate an APCS at its Commit phase, node 3 may first generate an APS at its Pro-Commit phase, node 4 may generate a PKB-1 at its Prepare phase, then nodes 1, 2, 3, may send their signatures to node 4 and node 4 may generate a GAS-4 signature.

In some embodiments, the process of generating the GAS signature is performed by each Leader node in turn. For example, at generic phase 4 of FIG. 13, in accordance with certain disclosed embodiments, node 1 may first generate an ACS, generate a first partial GAS-4, and then send the first partial GAS-4 to node 2; node 2 may then generate an APCS, aggregate it with the first partial GAS-4 received from node 1 and generate a second partial GAS-4, and then send the second partial GAS-4 to node 3; node 3 may then generate an APS, aggregate it with the second partial GAS-4 received from node 2, generate a third partial GAS-4, and then send the third partial GAS-4 to node 4; node 4 may then generate a PKB-1 and aggregate it with the third partial GAS-4 received from node 3, and then generate a GAS-4 and transmit to all validator nodes. In some embodiments, the GAS signature may be updated and generated simultaneously, or substantially simultaneously, by all the Leader nodes in the different pipelined processes, and there may be a triggering event when the GAS signature is finalized. In some embodiments, the order of the Leader nodes participating in generating the GAS signature may be based on predetermined rules. For example, the Leader node at the earliest phase of its respective request-fulfillment process, such as the Prepare phase, may be the last Leader node to participate in preparing and finalizing the GAS signature for a particular generic phase.

In some embodiments, the Leader node of a request-fulfillment process in the pipeline also may generate a snapshot containing information relating to state of the pipelined system. In some embodiments, only a request-fulfillment process in a pipeline for fulfilling candidate requests may generate a snapshot. In some embodiments, the Leader node may generate the snapshot at the Decide phase of the process for fulfilling candidate requests when it generates the KB-1. The Leader node may then transmit the KB-1 and the snapshot to the new Committee.

The snapshot, for example, may comprise data related to each validator node, status of the ongoing processes in the pipeline, a copy of one or more current blockchains, and the height of one or more blockchains. The data related to each validator node may comprise the identity, the IP address, public keys corresponding to each validator node, and data related to the candidate requests or transaction requests depending on whether each validator node is a Leader node or an Associate node with respect to each concurrent process in the pipeline. The status of the ongoing processes in the pipeline also, or alternatively, may comprise aggregate signatures of all ongoing processes in the pipeline. In some embodiments, a snapshot may be taken by any validator node that is involved in any of the ongoing request-fulfillment processes based on predetermined rules. For example, the predetermined rules may require a snapshot for every 100 new blocks successfully added to the KeyBlock blockchain and/or TransactionBlock blockchain. In this example, the Leader node that added the $100^{th}$ new block since last snapshot may generate the next snapshot at its Decide phase where the $100^{th}$ new KB-1 or TB is added.

In some embodiments, in forming a new Committee where the Leader node may have removed a previous validator node to replace it with a newly-selected Common node, the removed validator node also may be the Leader node of another ongoing process in the pipeline. In accordance with the disclosed embodiments of the invention, after a Leader node of a candidate request-fulfillment process generates a snapshot and transmits it to the new Committee, the ongoing process ("affected process") where the removed validator node is the Leader node of another request-fulfillment process may be treated based on predetermined rules.

In some embodiments, at each Decide phase of a process in the pipeline there may be a view change and the new Leader node may be the Leader node of the affected process. The view change may be based on a predetermined leader-rotation rule. In some embodiments, the leader-rotation rule may be a cyclical sequence of each validator node corresponding to the sequence of request-fulfillment processes. In other exemplary embodiments where there may not be a view change at every Decide phase, the predetermined rules may ensure there is a view-change process by the end of the generic phase where the Leader node is the removed validator node, and the new Leader node may be the Leader node of the affected process.

In some embodiments, the new Leader node of the affected process may take over the aggregated signature from the removed previous validator node and continue with the affected process. In accordance with certain disclosed embodiments, the aggregated signature may be formed using a GAS signature. For example, process 1 in FIG. 13 may be a candidate request fulfillment process and node 5 may be determined to be the newly-added Common node replacing node 4 in the Committee. At generic process 4 where process 1 is at Decide phase, GAS-4 is generated and transmitted to validator nodes in the new Committee that includes node 5 but excludes node 4.

In some other embodiments, the affected process is abandoned and the new Leader node may restart the affected process from its Prepare phase. For example, process 1 in FIG. 13 may be a candidate request-fulfillment process and node 5 may be determined to be the newly-added Common node replacing node 4 in the Committee. At generic process 4 where process 1 is at Decide phase, a GAS-4 signature may be generated and transmitted to validator nodes in the new Committee that includes node 5 but excludes node 4. Node 5 also may be determined by the view-change process to be the new Leader node of process 4. In this example, process 4 may be terminated and the GAS-4 signature does not include an aggregate signature generated at generic phase 4. Instead, Associate nodes of the process 4 may send transaction requests to node 5. Then, at generic phase 5, during the Prepare phase of process 5, node 5 may generate a PKB-1 and transmit the PKB-1 to its Associate nodes. In any event, the affected process 5 need to be restarted, the Committee and the next Leader node may be able to conduct the process at any time because the snapshot may contain the related data.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps.

For example, the methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. In some embodiments, the processor may be part of a server, cloud server, client, network infrastructure, mobile computing platform, stationary computing platform, or other computing platform. The storage medium associated with the processor for storing methods, programs, codes, program instructions or other type of instructions capable of being executed by the computing or processing device may include but may not be limited to one or more of a SSD, optical disk, flash memory, hard disk, RAM, ROM, cache and the like.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. As noted above, it will further be appreciated that one or more of the processes may be realized as a computer executable code capable of being executed on a machine-readable medium.

Accordingly, it is intended that the specification and examples be considered as exemplary only, with a true scope and spirit being indicated by the following claims and their full scope of equivalents.

What is claimed is:

1. A network node in a network comprising a committee of validator nodes, the committee of validator nodes comprising at least one leader node and a plurality of associate nodes, wherein the committee consists of n validator nodes and satisfies the relation that n is greater than or equal to $(3f+1)$ to accommodate a fault tolerance of up to $f$ faulty validator nodes, wherein the leader node is configured to transmit information to the plurality of associate nodes and receive at least $(2f+1)$ responses from the plurality of associate nodes, wherein the network node is a leader node in the committee, and wherein the network node comprises at least one processor and at least one memory containing instructions that, when executed by the at least one processor, configure the network node to perform steps comprising:

receiving first partial signatures from the plurality of associate nodes;
generating a first aggregate signature based on the first partial signatures received from the plurality of associate nodes;
transmitting the first aggregate signature to the plurality of associate nodes;
receiving second partial signatures from the plurality of associate nodes;
generating a second aggregate signature based on the second partial signatures received from the plurality of associate nodes;
transmitting the second aggregate signature to the plurality of associate nodes;
receiving third partial signatures from the plurality of associate nodes;
generating a third aggregate signature based on the third partial signatures received from the plurality of associate nodes;
generating final data, the final data comprising the third aggregate signature;

transmitting the final data to the plurality of associate nodes;
receiving a plurality of candidate requests;
determining a new validator node to be added to the committee based on predetermined rules and the received candidate requests;
determining a validator node of the committee to be removed based on predetermined rules; and
generating preliminary data including information corresponding to the new validator node to be added and the validator node to be removed in the committee.

2. The network node of claim 1, wherein the leader node and the plurality of associate nodes in the committee are arranged as a tree structure.

3. The network node of claim 1, wherein generating the first aggregate signature based on the first partial signatures further comprises determining that at least a first threshold number of validator nodes in the committee have verified preliminary data received by the validator nodes in the committee.

4. The network node of claim 1, wherein generating the second aggregate signature based on the second partial signatures further comprises determining that at least a second threshold number of validator nodes have verified the first aggregate signature.

5. The network node of claim 1, wherein generating the third aggregate signature based on the third partial signatures further comprises determining that at least a third threshold number of validator nodes have verified the second aggregate signature.

6. The network node of claim 1, wherein the data is a block in a blockchain.

7. The network node of claim 1, wherein the first aggregate signature, the second aggregate signature, and the third aggregate signature are in the form of numerical values.

8. The network node of claim 1, wherein the final data comprises at least one public cryptographic key for a next term of the committee.

9. A network node in a network that comprises a committee of validator nodes, the committee of validator nodes comprising at least one leader node and a plurality of associate nodes, wherein the committee consists of n validator nodes and satisfies the relation that n is greater than or equal to (3f+1) to accommodate a fault tolerance of up to f faulty validator nodes, wherein the leader node is configured to transmit information to the plurality of associate nodes and receive at least (2f+1) responses from the plurality of associate nodes, wherein the network node is an associate node in the committee, and wherein the network node comprises at least one processor and at least one memory containing instructions that, when executed by the at least one processor, configure the network node to perform steps comprising:
receiving a plurality of candidate requests from the network;
transmitting the plurality of candidate requests to the leader node;
receiving preliminary data generated by the leader node;
verifying the preliminary data, wherein verification of the preliminary data further comprises:
determining a new validator node to be added to the committee based on predetermined rules and the received candidate requests;
determining a validator node of the committee to be removed based on predetermined rules; and
determining whether the preliminary data includes information corresponding to the new validator node to be added and the validator node to be removed in the committee;
generating a first partial signature based on the verification;
transmitting the first partial signature to the leader node;
receiving a first aggregate signature from the leader node;
generating a second partial signature based on the first aggregate signature;
transmitting the second partial signature to the leader node;
receiving a second aggregate signature from the leader node;
generating a third partial signature based on the second aggregate signature;
transmitting the third partial signature to the leader node; and
receiving final data from the leader node, the final data comprising the third aggregate signature.

10. The network node of claim 9, wherein the leader node and the plurality of associate nodes are arranged as a tree structure.

11. The network node of claim 9, wherein generating the first partial signature based on the verification further comprises generating the first partial signature after determining that the preliminary data includes information corresponding to the new validator node to be added and the validator node to be removed in the committee.

12. The network node of claim 9, wherein the final data is a block in a blockchain.

13. The network node of claim 9, wherein the final data comprises at least one public cryptographic key for a next term of the committee.

14. The network node of claim 9, wherein generating the third partial signature based on the second aggregate signature further comprises determining that at least a second threshold number of validator nodes have verified the second aggregate signature.

15. The network node of claim 9, wherein the steps further comprises:
starting a heartbeat monitor, wherein the heartbeat monitor is configured to determine the liveness of the leader node;
determining by the heartbeat monitor a timeout condition of the leader node;
generating a request for a view change; and
transmitting the request for a view change to the committee of validator nodes.

16. The network node of claim 15, wherein the steps further comprises:
determining that at least a first threshold number of validator nodes have transmitted the request for a view change wherein the request comprises a message that the network node is a leader node of next view; and
becoming the leader node of the next view.

17. The network node of claim 15, wherein determining the timeout condition comprises:
determining based on the expiration of a certain time period after transmitting a partial signature to the leader node.

18. The network node of claim 9, wherein the steps further comprises:
after receiving a plurality of candidate requests, starting a heartbeat monitor, wherein the heartbeat monitor is configured to determine the liveness of the leader node;

determining that the number of new transaction blocks added to a TransactionBlock blockchain exceeds a threshold number;
generating a request for a view change; and
transmitting the request for a view change to the committee of validator nodes.

\* \* \* \* \*